(12) United States Patent
Wang et al.

(10) Patent No.: US 11,513,957 B2
(45) Date of Patent: Nov. 29, 2022

(54) PROCESSOR AND METHOD IMPLEMENTING A CACHELINE DEMOTE MACHINE INSTRUCTION

(71) Applicant: Intel Corporation, Santa Clara, CA (US)

(72) Inventors: Ren Wang, Portland, OR (US); Andrew J. Herdrich, Hillsboro, OR (US); Yen-cheng Liu, Portland, OR (US); Herbert H. Hum, Portland, OR (US); Jong Soo Park, Santa Clara, CA (US); Christopher J. Hughes, Santa Clara, CA (US); Namakkal N. Venkatesan, Hillsboro, OR (US); Adrian C. Moga, Portland, OR (US); Aamer Jaleel, Northborough, MA (US); Zeshan A. Chishti, Hillsboro, OR (US); Mesut A. Ergin, Portland, OR (US); Jr-shian Tsai, Portland, OR (US); Alexander W. Min, Portland, OR (US); Tsung-yuan C. Tai, Portland, OR (US); Christian Maciocco, Portland, OR (US); Rajesh Sankaran, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 17/027,248

(22) Filed: Sep. 21, 2020

(65) Prior Publication Data
US 2021/0004328 A1 Jan. 7, 2021

Related U.S. Application Data

(63) Continuation of application No. 14/583,389, filed on Dec. 26, 2014, now Pat. No. 10,817,425.

(51) Int. Cl.
*G06F 12/0842* (2016.01)
*G06F 12/0893* (2016.01)
(Continued)

(52) U.S. Cl.
CPC ...... *G06F 12/0842* (2013.01); *G06F 9/45558* (2013.01); *G06F 12/0813* (2013.01);
(Continued)

(58) Field of Classification Search
None
See application file for complete search history.

(56) References Cited

U.S. PATENT DOCUMENTS 6,330,643 B1   12/2001  Arimilli et al.
8,856,455 B2 *  10/2014  Ghai ............... G06F 12/126
                                                 711/119
(Continued)

FOREIGN PATENT DOCUMENTS

CN    101495968 A    7/2009
CN    103119568 A    5/2013
(Continued)

OTHER PUBLICATIONS

Advisory Action for U.S. Appl. No. 14/583,389, dated Aug. 30, 2017, 3 pages.
(Continued)

*Primary Examiner* — Edward J Dudek, Jr.
*Assistant Examiner* — Ralph A Verderamo, III
(74) *Attorney, Agent, or Firm* — Compass IP Law PC

(57) ABSTRACT

Methods and apparatus implementing Hardware/Software co-optimization to improve performance and energy for inter-VM communication for NFVs and other producer-consumer workloads. The apparatus include multi-core processors with multi-level cache hierarchies including and L1 and L2 cache for each core and a shared last-level cache
(Continued)

(LLC). One or more machine-level instructions are provided for proactively demoting cachelines from lower cache levels to higher cache levels, including demoting cachelines from L1/L2 caches to an LLC. Techniques are also provided for implementing hardware/software co-optimization in multi-socket NUMA architecture system, wherein cachelines may be selectively demoted and pushed to an LLC in a remote socket. In addition, techniques are disclosure for implementing early snooping in multi-socket systems to reduce latency when accessing cachelines on remote sockets.

20 Claims, 18 Drawing Sheets

(51) Int. Cl.
  *G06F 12/109* (2016.01)
  *G06F 12/0813* (2016.01)
  *G06F 12/0831* (2016.01)
  *G06F 9/455* (2018.01)

(52) U.S. Cl.
  CPC ...... *G06F 12/0833* (2013.01); *G06F 12/0893* (2013.01); *G06F 12/109* (2013.01); *G06F 2009/45595* (2013.01); *G06F 2212/1021* (2013.01); *G06F 2212/283* (2013.01); *G06F 2212/62* (2013.01); *Y02D 10/00* (2018.01)

(56) References Cited

U.S. PATENT DOCUMENTS

| | | |
|---|---|---|
| 2008/0229009 A1 | 9/2008 | Gaither et al. |
| 2009/0037658 A1 | 2/2009 | Sistla |
| 2009/0043966 A1 | 2/2009 | Shen et al. |
| 2009/0198960 A1 | 8/2009 | Arimilli et al. |
| 2010/0153650 A1 | 6/2010 | Guthrie et al. |
| 2010/0306472 A1 | 12/2010 | Luick |
| 2013/0346683 A1* | 12/2013 | Walker ............... G06F 12/0804 711/105 |
| 2014/0129773 A1* | 5/2014 | Habermann ........ G06F 12/0846 711/122 |
| 2014/0173213 A1 | 6/2014 | Beveridge |
| 2014/0173214 A1 | 6/2014 | Ramrakhyani et al. |
| 2014/0289471 A1 | 9/2014 | Rozas |

FOREIGN PATENT DOCUMENTS

| | | |
|---|---|---|
| CN | 104011694 A | 8/2014 |
| CN | 104145252 A | 11/2014 |
| WO | 2016106128 A1 | 6/2016 |

OTHER PUBLICATIONS

Dice, et al., "Lightweight Contention Management for Efficient Compare- and-Swap Operations", Proceedings of the 19th international conference on Parallel Processing, 2013, pp. 1-25.
Final Office Action for U.S. Appl. No. 14/583,389, dated Jun. 13, 2017, 24 pages.
First Office Action for U.S. Appl. No. 14/583,389, dated Dec. 15, 2016, 25 pages.
Herlihy, Maurice, "Wait-Free Synchronization", Digital Equipment Corporation, ACM Transactions on Programming Languages and Systems, vol. 11, No. 1, Jan. 1991, pp. 124-149.
Hwang, et al., "NetVM: High Performance and Flexible Networking Using Virtualization on Commodity Platforms", 11th USENIX Symposium on Networked Systems Design and Implementation, Apr. 2-4, 2014, 15 pages.
Intel, "Intel® 64 and IA-32 Architectures Software Developer Manuals", Feb. 15, 2016, 6 pages.
Intel, "Intel® Data Plane Development Kit (Intel® DPDK) v Switch", Document No. 329865-003, Jan. 2014, 52 pages.
Intel, "Open vSwitch with DPDK", retrieved from internet on Mar. 19, 2015, 5 pages.
International Preliminary Report on Patentability and Written Opinion received for PCT Patent Application No. PCT/US2015/066712, dated Jul. 6, 2017, 12 pages.
International Search Report and Written Opinion received for PCT Patent Application No. PCT/US2015/066712 , dated May 4, 2016, 15 pages.
Macdonell, et al., "Low-Latency, High-Bandwidth Use Cases for Nahanni / Ivshmem", KVM Forum 2011, 24 pages.
Park, et al., "Location-Aware Cache Management for Many-Core Processors with Deep Cache Hierarchy", Parallel Computing Lab, Intel Corporation, 2013, 12 pages.
Rizzo, et al., "VALE, a switched Ethernet for virtual machines", Jun. 2012, 12 pages.
Smith, et al., "Draft: Have you checked your IPC performance lately?", 2012, 6 pages.
Suhane, et al.,"Performance Analysis of Backoff Algorithm in IEEE 802.11 Networks", International Journal of Scientific & Engineering Research vol. 2, Issue 6, Jun. 2011, pp. 58-61.
Zhou, et al. "Scalable, High Performance Ethernet Forwarding with CUCKOOSWITCH", CoNext 13, Dec. 2013, 12 pages.
P.R. China State Intellectual Property Office First Office Action for Patent Application No. 201580064745.7, dated Apr. 20, 2020, 10 pages.
P.R. China State Intellectual Property Office Second Office Action for Patent Application No. 201580064745.7, dated Nov. 24, 2020, 9 pages.

* cited by examiner

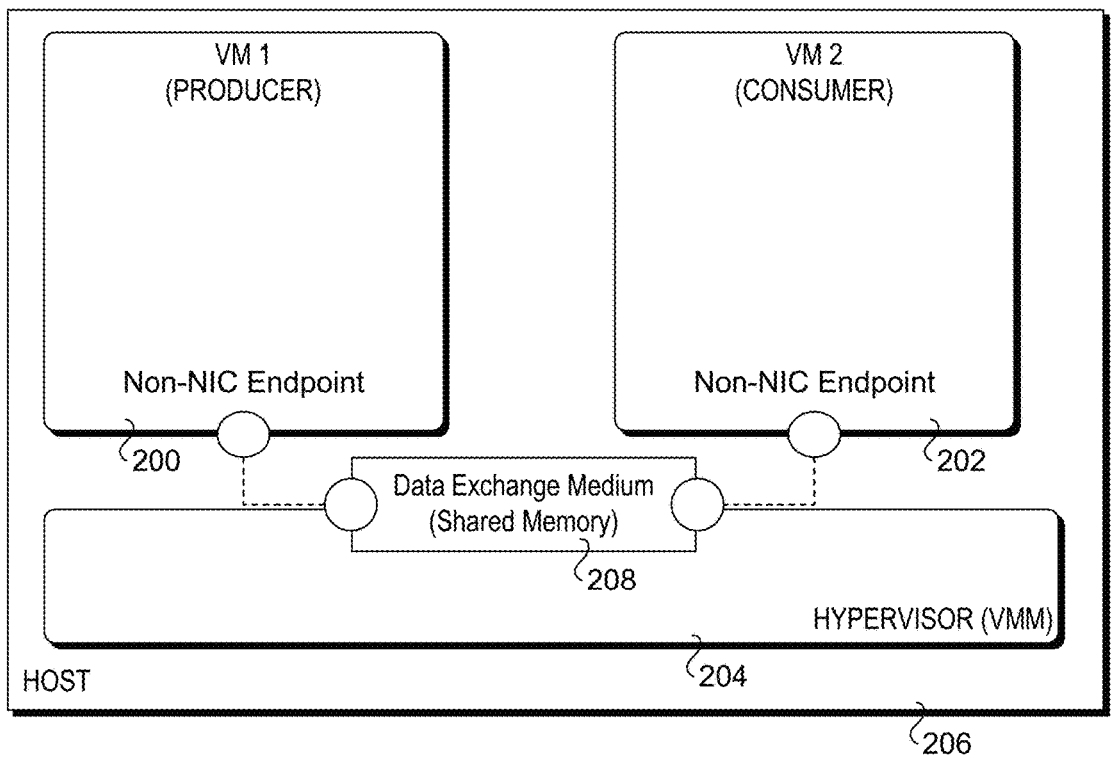
Fig. 2 *(Prior Art)*
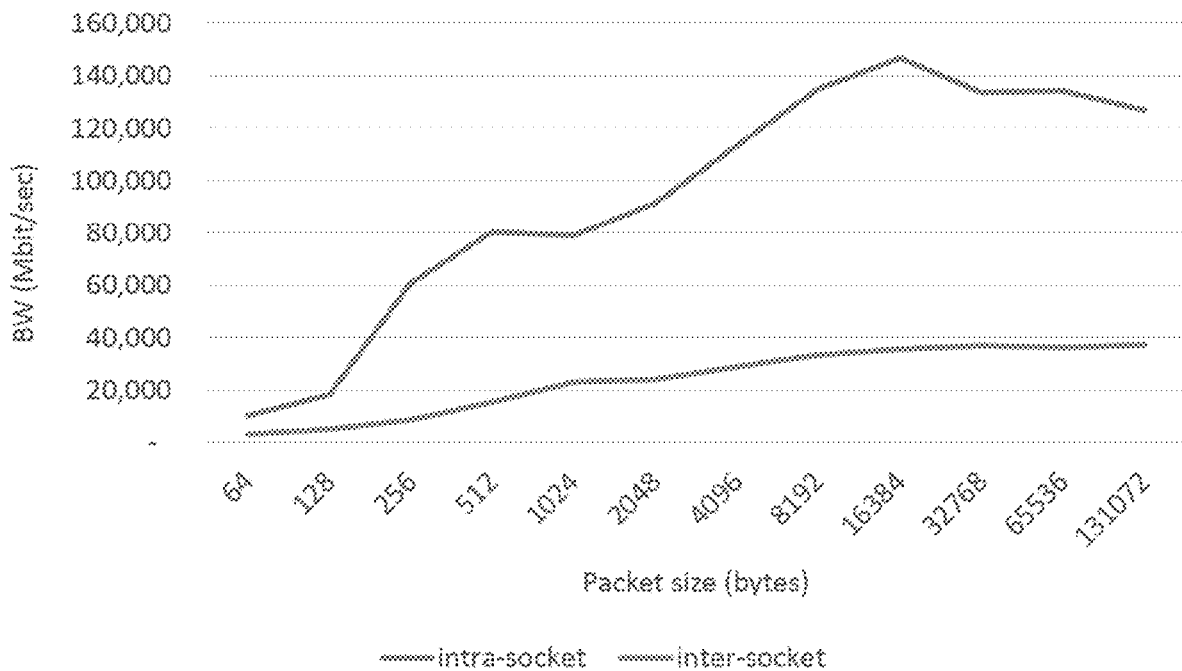
Fig. 3

Fig. 6 *(Prior Art)*

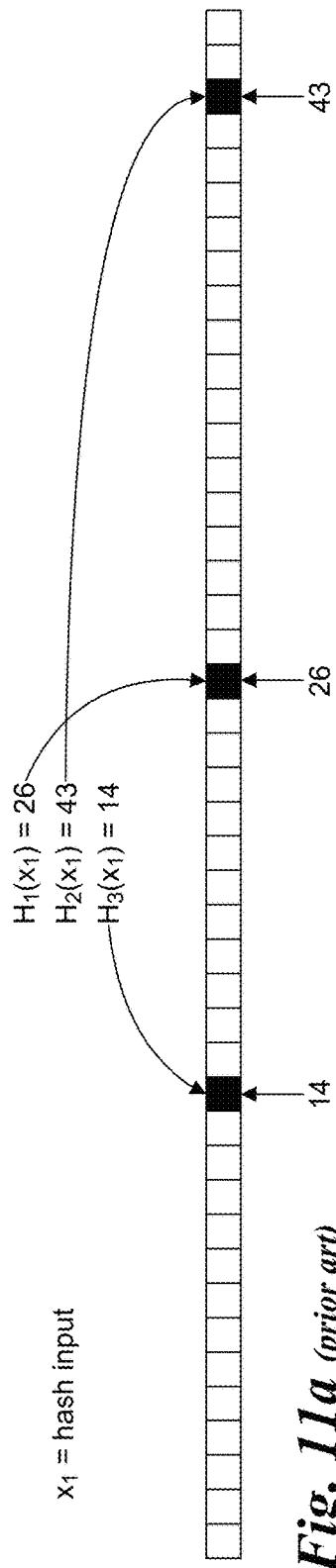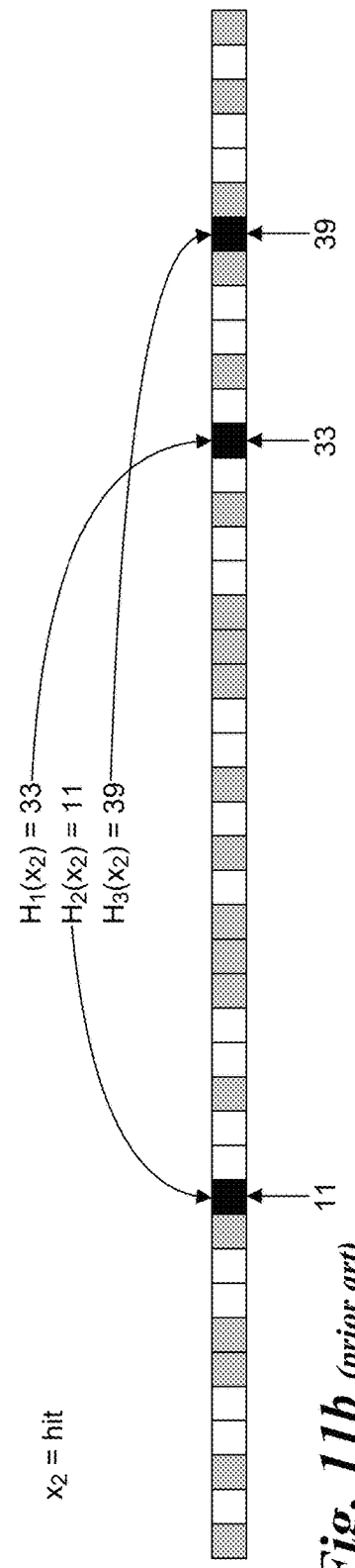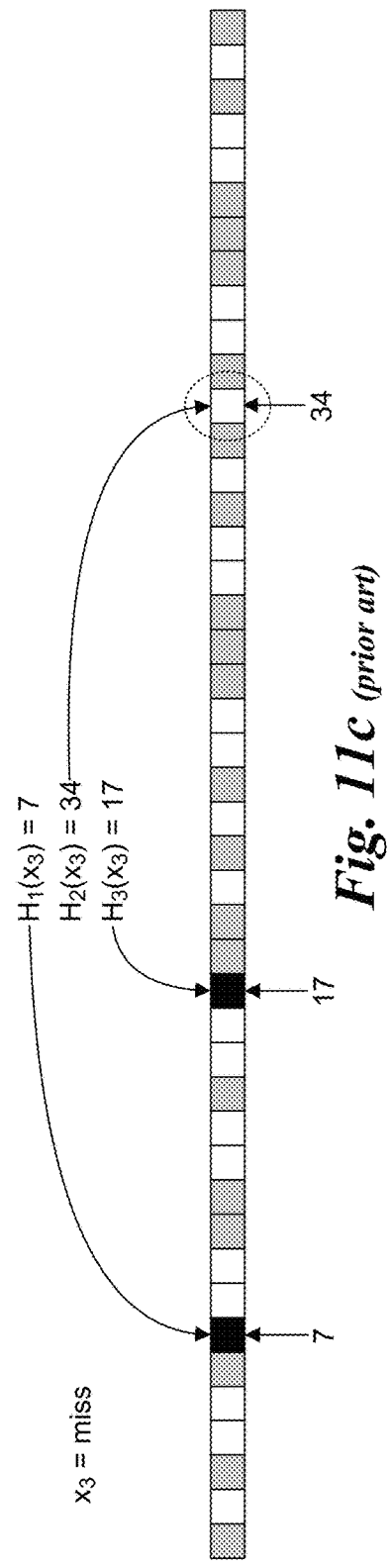
Fig. 11a *(prior art)*   Fig. 11b *(prior art)*   Fig. 11c *(prior art)*

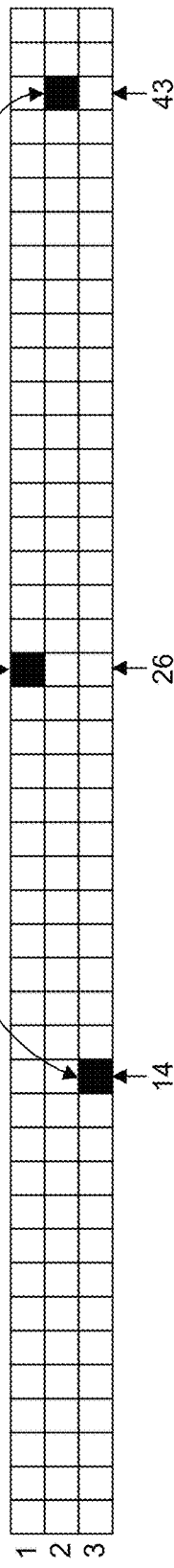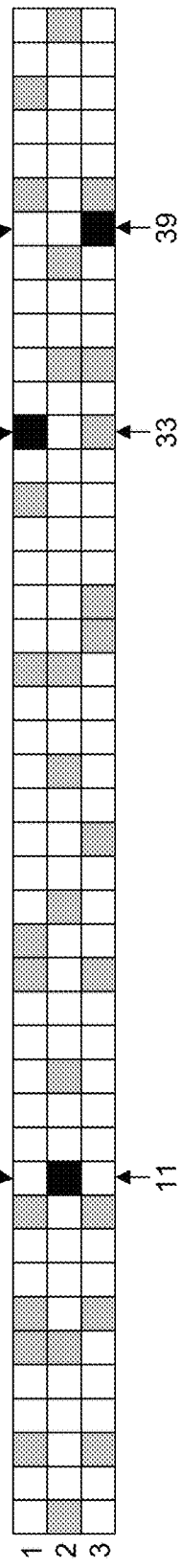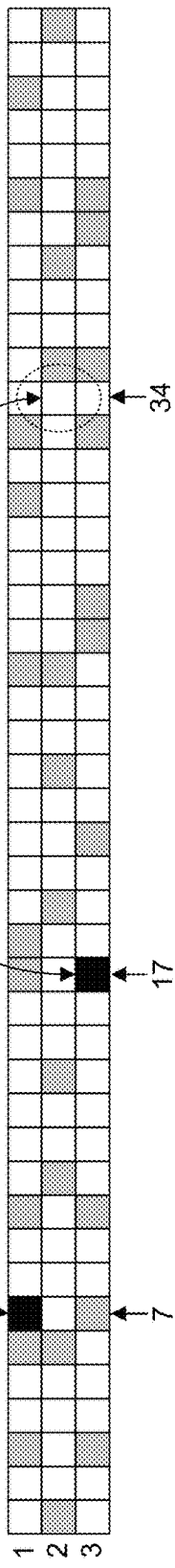

PROCESSOR AND METHOD IMPLEMENTING A CACHELINE DEMOTE MACHINE INSTRUCTION

CROSS-REFERENCE TO RELATED APPLICATION(S)

The present application claims priority to U.S. patent application Ser. No. 14/583,389, entitled "HARDWARE/SOFTWARE CO-OPTIMIZATION TO IMPROVE PERFORMANCE AND ENERGY FOR INTER-VM COMMUNICATION FOR NFVS AND OTHER PRODUCER-CONSUMER WORKLOADS," and filed on Dec. 26, 2014, the entirety of which is incorporated by reference herein.

BACKGROUND INFORMATION

Access to computer networks has become a ubiquitous part of today's computer usage. Whether accessing a Local Area Network (LAN) in an enterprise environment to access shared network resources, or accessing the Internet via the LAN or other access point, it seems users are always logged on to at least one service that is accessed via a computer network. Moreover, the rapid expansion of cloud-based services has led to even further usage of computer networks, and these services are forecast to become ever-more prevalent.

Networking is facilitated by various types of equipment including routers, switches, bridges, gateways, and access points. Large network infrastructure typically includes use of telecommunication-class network elements, including switches and routers made by companies such as Cisco Systems, Juniper Networks, Alcatel Lucent, IBM, and Hewlett-Packard. Such telecom switches are very sophisticated, operating at very-high bandwidths and providing advanced routing functionality as well as supporting different Quality of Service (QoS) levels. Private networks, such as Local area networks (LANs), are most commonly used by businesses and home users. It is also common for many business networks to employ hardware- and/or software-based firewalls and the like.

In recent years, virtualization of computer systems has seen rapid growth, particularly in server deployments and data centers. Under a conventional approach, a server runs a single instance of an operating system directly on physical hardware resources, such as the CPU, RAM, storage devices (e.g., hard disk), network controllers, I/O ports, etc. Under one virtualized approach using Virtual Machines (VMs), the physical hardware resources are employed to support corresponding instances of virtual resources, such that multiple VMs may run on the server's physical hardware resources, wherein each virtual machine includes its own CPU allocation, memory allocation, storage devices, network controllers, I/O ports etc. Multiple instances of the same or different operating systems then run on the multiple VMs. Moreover, through use of a virtual machine manager (VMM) or "hypervisor," the virtual resources can be dynamically allocated while the server is running, enabling VM instances to be added, shut down, or repurposed without requiring the server to be shut down. This provides greater flexibility for server utilization, and better use of server processing resources, especially for multi-core processors and/or multi-processor servers.

Under another virtualization approach, container-based OS virtualization is used that employs virtualized "containers" without use of a VMM or hypervisor. Instead of hosting separate instances of operating systems on respective VMs, container-based OS virtualization shares a single OS kernel across multiple containers, with separate instances of system and software libraries for each container. As with VMs, there are also virtual resources allocated to each container.

Deployment of Software Defined Networking (SDN) and Network Function Virtualization (NFV) has also seen rapid growth in the past few years. Under SDN, the system that makes decisions about where traffic is sent (the control plane) is decoupled for the underlying system that forwards traffic to the selected destination (the data plane). SDN concepts may be employed to facilitate network virtualization, enabling service providers to manage various aspects of their network services via software applications and APIs (Application Program Interfaces). Under NFV, by virtualizing network functions as software applications, network service providers can gain flexibility in network configuration, enabling significant benefits including optimization of available bandwidth, cost savings, and faster time to market for new services.

Today there are large amount of proprietary network appliances that make additions and upgrades more and more difficult. Such network appliance include routers, firewalls, etc. which maintain real-time state of subscriber mobility, voice and media calls, security, contextual content management, etc. NFV technology consolidates these network functions onto general purpose X86 servers and can greatly reduce the configuration and upgrading complexity.

When several NFVs are consolidated, e.g., implemented as a set of Virtual Machines (VM) in one platform, it requires very efficient network packet handing due to the nature of the workloads and the high line-rate of current (10 Gigabits per second (Gbps)) and future (40 Gbps and 100 Gbps) network interfaces. On a multicore X86 server, those packets are forwarded (via inter-VM communication) and processed by NFV modules in VMs on different cores.

Under recent testing of a conventional implementation, it has been observed that the packet throughput of inter-VM communication, especially for small packets (e.g., 64 B, which is important to telecommunication companies) are far from satisfactory. There are several performance bottlenecks, in terms of both software and hardware inefficiencies.

Current solutions mainly focus on addressing software bottlenecks. The general idea of these inter-VM communication schemes involves reducing memory copy overhead by reducing number of copies of packet data, e.g., using shared memories. However, the performance improvement using these software-only approaches is limited.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein like reference numerals refer to like parts throughout the various views unless otherwise specified:

FIG. 2 is a schematic diagram illustrating a producer-consumer model employing shared memory;

FIG. 3 is a graph comparing data transfer bandwidths for intra-socket and inter-socket communications;

FIGS. 11a-11c illustrate how a Bloom filter employing multiple hash algorithms and a single-dimension bit vector operates;

FIGS. 12a-12c illustrate how a Bloom filter employing multiple hash algorithms and respective bit vectors operates;

DETAILED DESCRIPTION

Figure 1:
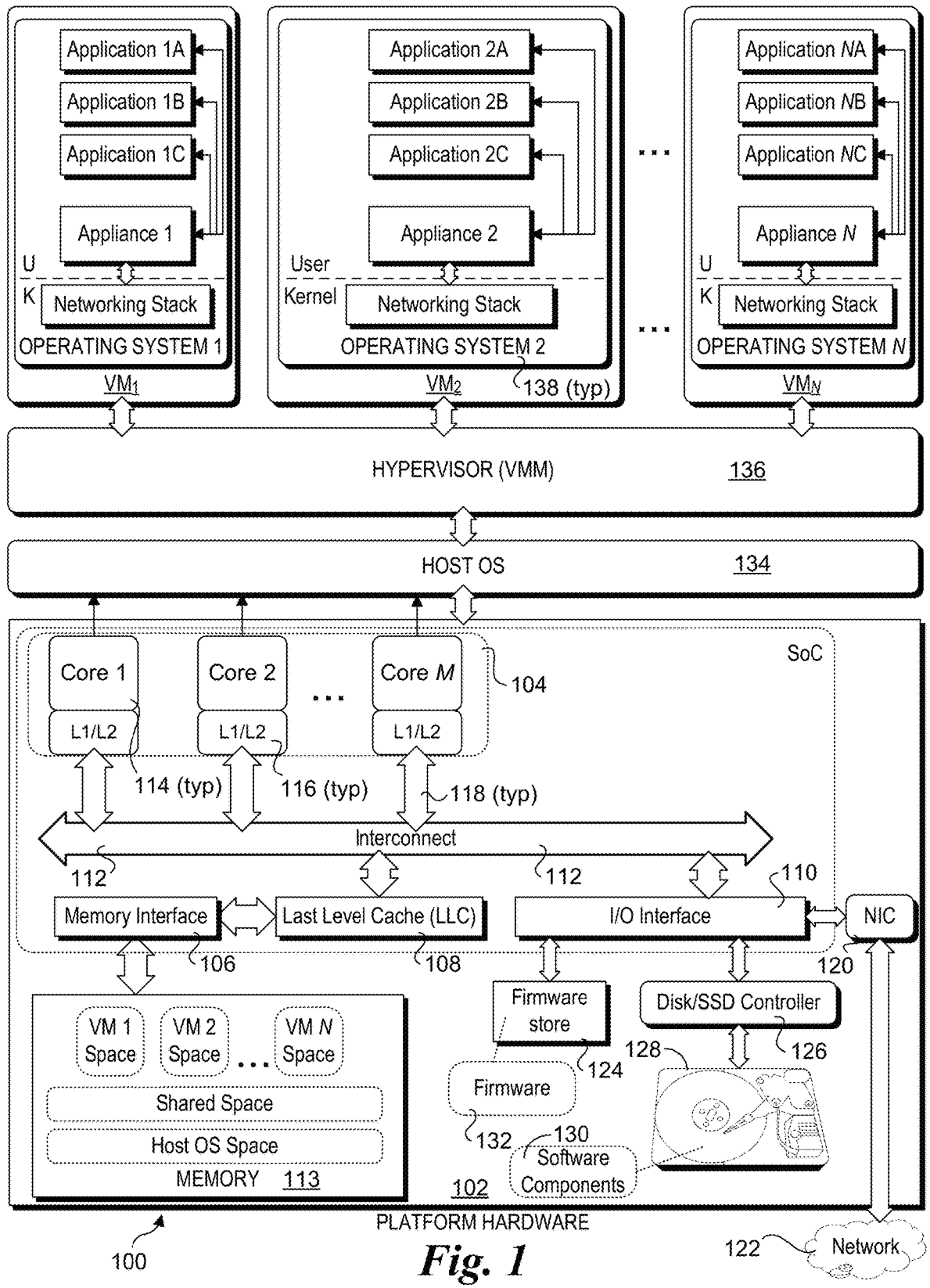
FIG. 1 is a schematic diagram illustrating an exemplary host platform configuration including platform hardware and various software-based components including NFV components.

Embodiments of methods and apparatus implementing Hardware/Software co-optimization to improve performance and energy for inter-VM communication for NFVs and other producer-consumer workloads are described herein. In the following description, numerous specific details are set forth to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

For clarity, individual components in the Figures herein may also be referred to by their labels in the Figures, rather than by a particular reference number. Additionally, reference numbers referring to a particular type of component (as opposed to a particular component) may be shown with a reference number followed by "(typ)" meaning "typical." It will be understood that the configuration of these components will be typical of similar components that may exist but are not shown in the drawing Figures for simplicity and clarity or otherwise similar components that are not labeled with separate reference numbers. Conversely, "(typ)" is not to be construed as meaning the component, element, etc. is typically used for its disclosed function, implement, purpose, etc.

As used herein, the terms "virtual appliance," "virtual network appliance," "network appliance," or simply "appliance" may be used interchangeably. In addition, for the purpose herein, including the claims, any software-based appliance relating to Software Defined Networking or configured to implement Network Function Virtualization may more generally be referred to as a "virtual appliance," with the understanding that virtual network appliances include any network appliance or virtualized entity that is configured to implement Network Function Virtualization and/or operations relating to Software Defined Networking. Accordingly, the terms virtual appliance in the following description includes all NFV appliances, as well. Additionally, the terms "cacheline" and "cache line" may also be used interchangeably FIG. 1 shows an exemplary host platform configuration 100 including platform hardware 102 and various software-based components including NFV components. Platform hardware 102 includes a central processing unit (CPU) 104 coupled to a memory interface 106, a last level cache (LLC) 108 and an input/output (I/O) interface 110 via an interconnect 112. In some embodiments, all or a portion of the foregoing components may be integrated on a System on a Chip (SoC). Memory interface 106 is configured to facilitate access to system memory 113, which will usually be separate from the SoC.

CPU 104 includes a core portion including M processor cores 116, each including a local level 1 (L1) and level 2 (L2) cache. Optionally, the L2 cache may be referred to as a "middle-level cache" (MLC) As illustrated, each processor core 116 has a respective connection 118 to interconnect 110 and operates independently from the other processor cores.

For simplicity, interconnect 110 is shown as a single double-ended arrow representing a single interconnect structure; however, in practice, interconnect 110 is illustrative of one or more interconnect structures within a processor or SoC, and may comprise a hierarchy of interconnect segments or domains employing separate protocols and including applicable bridges for interfacing between the interconnect segments/domains. For example, the portion of an interconnect hierarchy to which memory and processor cores are connected may comprise a coherent memory domain employing a first protocol, while interconnects at a lower level in the hierarchy will generally be used for I/O access and employ non-coherent domains. The interconnect structure on the processor or SoC may include any existing interconnect structure, such as buses and single or multi-lane serial point-to-point, ring, or mesh interconnect structures.

I/O interface 110 is illustrative of various I/O interfaces provided by platform hardware 102. Generally, I/O interface 110 may be implemented as a discrete component (such as an ICH (I/O controller hub) or the like), or it may be implemented on an SoC. Moreover, I/O interface 110 may also be implemented as an I/O hierarchy, such as a Peripheral Component Interconnect Express (PCIe™) I/O hierarchy. I/O interface 110 further facilitates communication between various I/O resources and devices and other platform components. These include a Network Interface Controller (NIC) 120 that is configured to facilitate access to a network 122, and various other I/O devices, which include a firmware store 124, a disk/SSD controller 126, and a disk drive 128. More generally, disk drive 128 is representative of various types of non-volatile storage devices, including both magnetic- and optical-based storage devices, as well as solid-state storage devices, such as solid state drives (SSDs) or Flash memory.

The multiple cores 114 of CPU 104 are employed to execute various software components 130, such as modules and applications, which are stored in one or more non-volatile storage devices, such as depicted by disk drive 128. Optionally, all or a portion of software components 130 may be stored on one or more storage devices (not shown) that are accessed via a network 122

During boot up or run-time operations, various software components 130 and firmware 132 are loaded into system memory 113 and executed on cores 114 as processes comprising execution threads or the like. Depending on the particular processor or SoC architecture, a given "physical" core may be implemented as one or more logical cores, with processes being allocated to the various logical cores. For example, under the Intel® Hyperthreading™ architecture, each physical core is implemented as two logical cores.

Under a typical system boot for platform hardware 102, firmware 132 will be loaded and configured in system memory 113, followed by booting a host operating system (OS) 138. Subsequently, a hypervisor 136 (or VMM), which may generally comprise an application running on host OS 134, will be launched. Hypervisor 136 may then be employed to launch various virtual machines, $VM_{1-N}$, each of which will be configured to use various portions (i.e., address spaces) of system memory 113. In turn, each virtual machine $VM_{1-N}$ may be employed to host a respective operating system $138_{1-N}$.

During run-time operations, hypervisor 136 enables reconfiguration of various system resources, such as system memory 113, cores 114, and disk drive(s) 128. Generally, the virtual machines provide abstractions (in combination with hypervisor 136) between their hosted operating system and the underlying platform hardware 102, enabling the hardware resources to be shared among $VM_{1-N}$. From the viewpoint of each hosted operating system, that operating system "owns" the entire platform, and is unaware of the existence of other operating systems running on virtual machines. In reality, each operating system merely has access to only the resources and/or resource portions allocated to it by hypervisor 136.

As further illustrated in FIG. 1, each operating system includes a kernel space and a user space, both of which are implemented as memory spaces in system memory 113. The kernel space is protected and used to run operating system kernel components, including a networking stack. Optionally, the networking stack will be in the user space. Meanwhile, an operating system's user space is used to run user applications, as depicted by Appliances 1, 2, and N, and Applications 1A-C, 2A-C, and NA-C.

Generally, Appliances 1, 2, and N are illustrative of various SDN or NFV appliances that may run on virtual machines on platform hardware 102. For simplicity, each $VM_{1-N}$ is depicted as hosting a similar set of software applications; however, this is merely for illustrative purposes, as the VMs for a given platform may host similar applications, or may host different applications. Similarly, each $VM_{1-N}$ may host a single virtual network appliance (as shown), may host multiple virtual network appliances, or may not host any virtual network appliances.

Under SDN on a virtualized platform, data is passed between VMs over a virtual network. Generally, this may be implemented via virtual NICs for each VM, and a virtual switch in the hypervisor or VMM. Under a non-optimized conventional approach, the virtual switch is actually implemented in a manner similar to a physical switch, meaning the virtual switch includes input and output buffers and performs various packet flow operations. As with a physical switch, there are latencies that occur with each step of the data transfer sequence between the virtual NICs, which results in a substantial downgrade in performance.

In a virtualized environment including multiple VMs hosted on the same physical machine, the medium of communication is the memory subsystem. Therefore, expecting a very high throughput performance from the linkage of these VMs is not unrealistic. However, measurements from VMs on a typical modern server using a multitude of virtualization software reveals that the inter-VM communication performance is nowhere near what the memory subsystem could potentially achieve in terms of data throughput. For example, cloud workloads usually achieve a packet transfer rate of around one million packets per second between two VMs. Telco workloads, which typically use highly optimized software stacks and libraries, can usually achieve packet transfer rates of about ten million packets per second between two VMs.

The most efficient inter-VM solution currently in the art rely on a shared memory as the data medium for packet communication, as shown in FIG. 2, which depicts a pair of VMs 200 and 202 and a hypervisor 204 running on a host platform 206. VM 200 is a producer, which writes a packet into the shared memory, which comprises data exchange medium 208, while the VM 202 is a consumer that reads the packet from the shared memory. In order to keep data correctness, there is also a "ready" flag (not shown) used to guarantee the producer and consumer do not over-run each other.

As mentioned above, there is a lot of VM and network stack related software overhead involved in this case that prevents the packet throughput from reaching the bandwidth upper bound of the host platform's memory system. In order to separate the pure software overhead (which could eventually be addressed by many ongoing software optimization efforts), an IPC memory benchmark was used to emulate the inter-VM packet communication in terms of memory access behaviors to study the hardware bottlenecks.

The benchmark that was used for the emulation is called mempipe-spin (Smith et al., Draft: Have you checked your IPC performance lately?, UNENIX 2012). Its data-path behavior mimics the inter-VM communication described above, minus the VM overheads, with shared ring memory for producer thread and consumer thread, and a ready flag that needs to be checked before read or write operation. The consumer uses a pull mode to check if the flag is ready, which is very similar to the pull model used in DPDK packet processing.

FIG. 3 shows the throughput performance of mempipe-spin, with 2 threads running on 2 cores within a socket, and also 2 threads running on different sockets. From FIG. 3, we have two main observations. First, the throughput for communications within the socket, especially with smaller packet size, is far from the physical bandwidth limitation. Second, when the producer and consumer are on different sockets, the throughput performance becomes much worse.

During a producer-consumer data transfer, a first thread running on the producer writes a chunk of data (also referred to as a data object), which is then read by one or more other threads (depending on the number of consumers and the software architecture). When the data exchange medium is shared memory, on an abstract level this involves the producer writing data into a location in shared memory (e.g., at an address at which the data object is stored), and the consumer thread(s) accessing that location in shared memory. Easy and straightforward; that is, until you consider that the shared memory location may be replicated across different locations in system memory and various caches.

To illustrate this, we'll start off with a simple example illustrating a software application comprising a producer accessing data so that the software application can modify the data prior to sending it to a consumer. This is shown in FIG. 4a, which shows further detail to the platform hardware and software architectures depicted in FIG. 1.

In virtualized environments employing many VMs, it is a preferred practice to allocate a physical or logical processor core to each VM. This enables multiple threads corresponding to a given guest operating system processes and applications running on the guest OS to be executed on the same core. It also significantly improves memory accesses via the use of L1 and L2 caches for the core, as will become more evident below. Accordingly, in some of the Figures herein, VMs are shown as running on respective cores, recognizing that there may be instances in which a single core may host multiple VMs. While it is possible for the processes for a single VM to run on multiple cores (e.g., for a personal computer running a single VM such as an Apple Macintosh computer running a VM hosting a Microsoft Windows OS), that is not a likely usage scenario in SDN and NFV deployments.

As illustrated, each of the cores $114_1$ and $114_2$ include a respective L1 cache $116_1$ and $116_2$, and a respective L2 cache $118_1$ and $118_2$, each including multiple cachelines (also referred to a cache lines or cache blocks) depicted as rectangular blocks. LLC 108 includes a set of LLC cachelines 402, and system memory 113 likewise includes multiple cachelines, including a set of memory cachelines 404 corresponding to a portion of shared space 406.

Figure 4A:
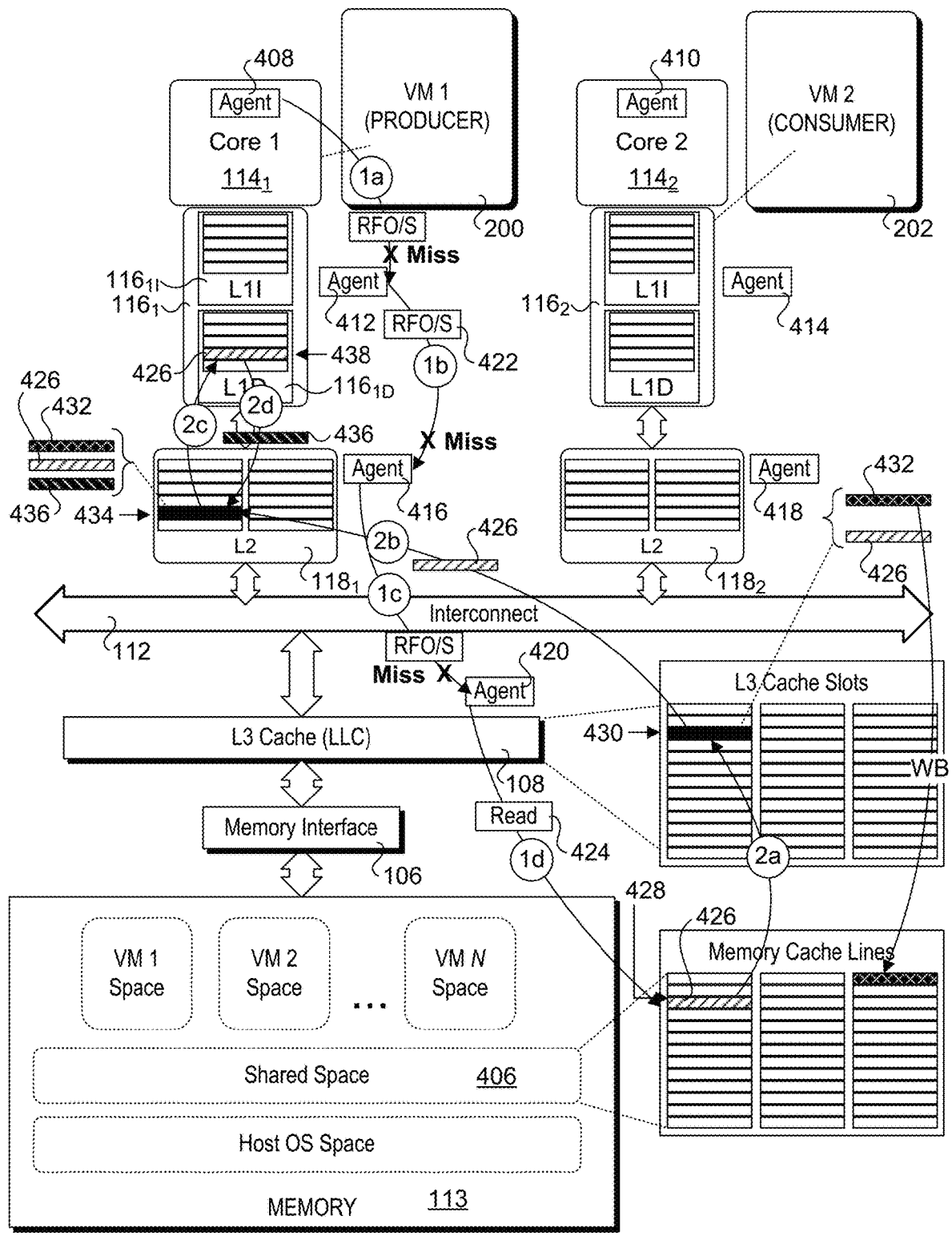
FIG. 4*a* is a schematic diagram illustrating access of a cacheline by a producer application that is not currently stored in any cache level and is accessed from system memory, under a conventional approach.
Figure 4B:
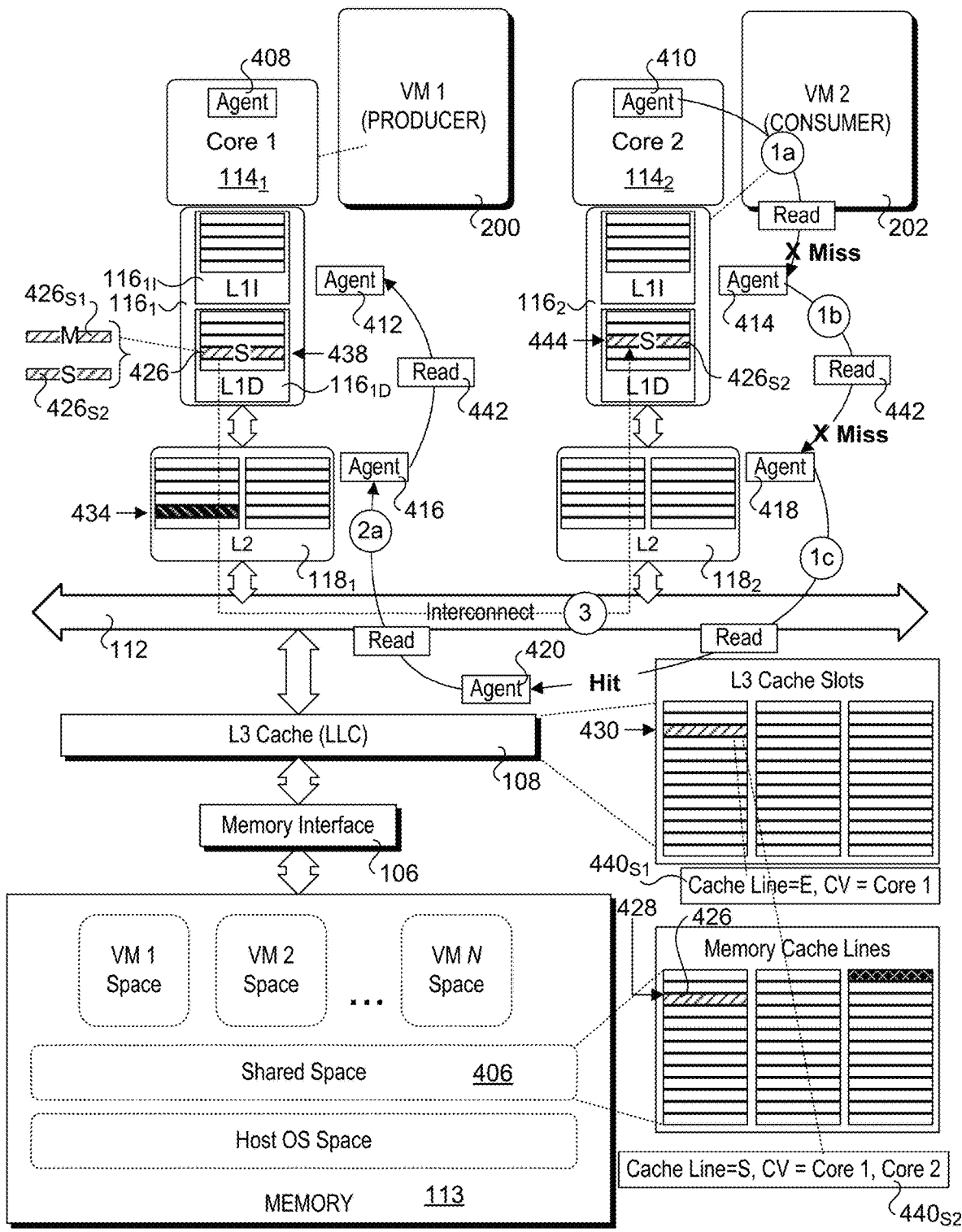
FIG. 4b is a schematic diagram illustrating a consumer application retrieving the cacheline from the L1 cache of the core executing the producer application, under a conventional approach.
Figure 5:
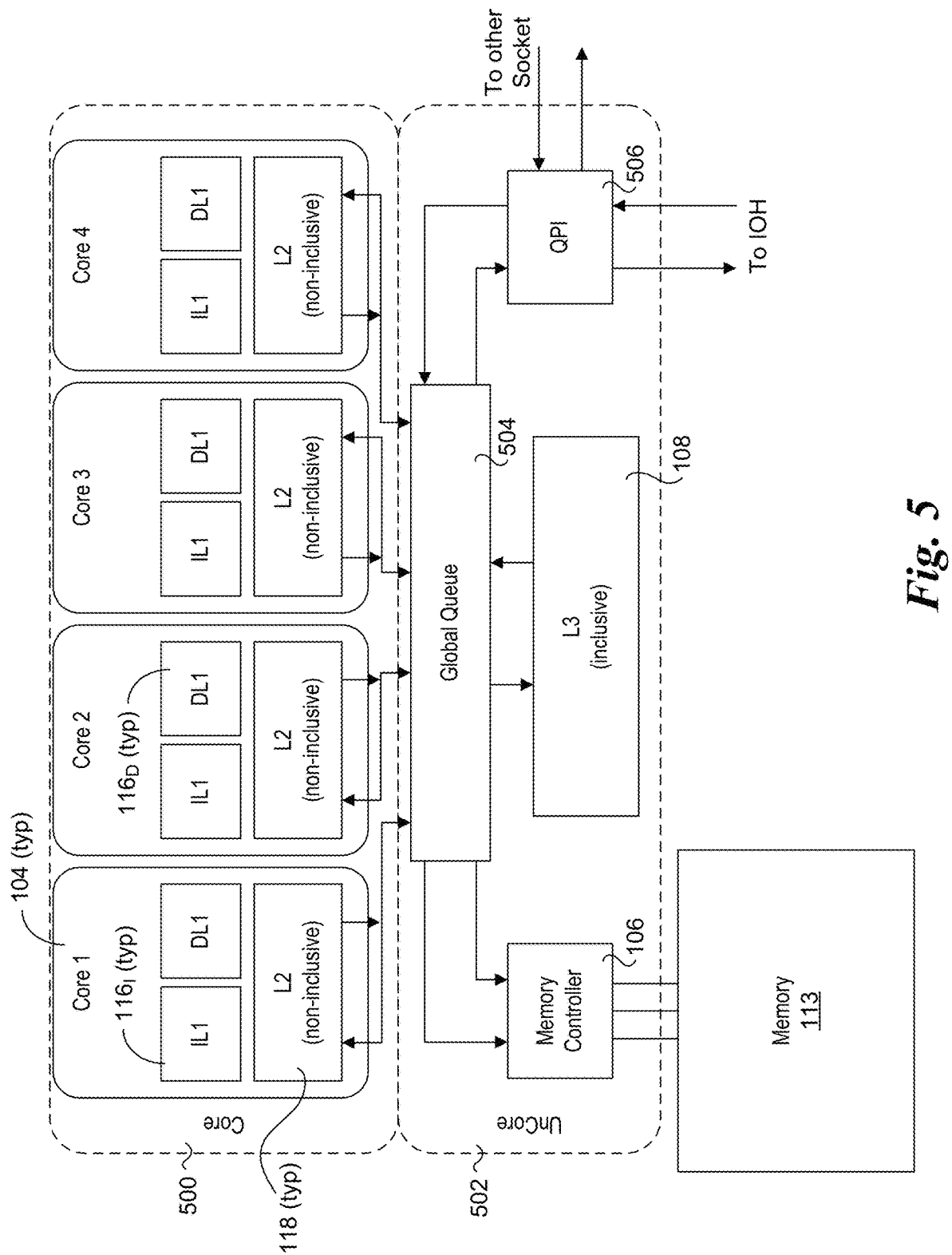
FIG. 5 is a schematic diagram illustrating an abstracted view of a memory coherency architecture employed by the platform shown in FIGS. 4a and 4b.

FIG. 5 shows an abstracted view of a memory coherency architecture employed by the embodiment of FIGS. 4a and 4b. Under this and similar architectures, such as employed by many Intel® processors, the L1 and L2 caches are part of a coherent memory domain under which memory coherency is managed by coherency mechanisms in the processor core 500. Each core 104 includes a L1 instruction (IL1) cache $116_I$, and L2 data cache (DL1) $116_D$, and an L2 cache 118.

L2 caches 118 are depicted as non-inclusive, meaning they do not include copies of any cachelines in the L1 instruction and data caches for their respective cores. As an option, L2 may be inclusive of L1, or may be partially inclusive of L1. In addition, L3 may be non-inclusive of L2. As yet a first option, L1 and L2 may be replaced by a cache occupying a single level in cache hierarchy.

Meanwhile, the LLC is considered part of the "uncore" 502, wherein memory coherency is extended through coherency agents, resulting in additional overhead and processor cycles. As shown, uncore 502 includes memory controller 106 coupled to external memory 113 and a global queue 504. Global queue 504 also is coupled to an L3 cache 108, and a QuickPath Interconnect® (QPI) interface 506. Optionally, interface 506 may comprise a Keizer Technology Interface (KTI). L3 cache 108 (which functions as the LLC in this architecture) is inclusive, meaning that it includes is a copy of each cacheline in the L1 and L2 caches.

As is well known, as you get further away from a core, the size of the cache levels increase, but so does the latency incurred in accessing cachelines in the caches. The L1 caches are the smallest (e.g., 32-64 KiloBytes (KB)), with L2 caches being somewhat larger (e.g., 256-640 KB), and LLCs being larger than the typical L2 cache by an order of magnitude or so (e.g., 8-16 MB). Of course, the size of these caches is dwarfed by the size of system memory (one the order of GigaBytes). Generally, the size of a cacheline at a given level in a memory hierarchy is consistent across the memory hierarchy, and for simplicity and historical references, lines of memory in system memory are also referred to as cachelines even though they are not actually in a cache. It is further noted that the size of global queue 504 is quite small, as it is designed to only momentarily buffer cachelines that are being transferred between the various caches, memory controller 106, and QPI interface 506.

FIG. 4a further shows multiple cache agents that are used to exchange messages and transfer data in accordance with a cache coherency protocol. The agents include core agents 408 and 410, L1 cache agents 412 and 414, L2 cache agents 416 and 418, and an L3 cache agent 420.

FIG. 4a illustrates a simple memory access sequence in which a cacheline is accessed from system memory and copied into L1 cache $116_1$ of core $114_1$. Data in system memory is stored in memory blocks (also referred to by convention as cachelines as discussed above), and each memory block has an associated address, such as a 64-bit address for today's 64-bit processors. From the perspective of applications, which includes the producers and consumers, a given chunk of data (data object) is located at a location in system memory beginning with a certain memory address, and the data is accessed through the application's host OS. Generally, the memory address is actually a virtual memory address, and through some software and hardware mechanisms, such virtual addresses are mapped to physical addresses behind the scenes. Additionally, the application is agnostic to whether all or a portion of the chunk of data is in a cache. On an abstract level, the application will ask the operating system to fetch the data (typically via address pointers), and the OS and hardware will return the requested data to the application. Thus, the access sequence will get translated by the OS as a request for one or more blocks of memory beginning at some memory address which ends up getting translated (as necessary) to a physical address for one or more requested cachelines.

Returning to FIG. 4a, the access sequence would begin with core 1141 sending out a Read for Ownership (RFO) message and first "snooping" (i.e., checking) its local L1 and L2 caches to see if the requested cacheline is currently present in either of those caches. In this example, producer 200 desires to access the cacheline so its data can be modified, and thus the RFO is used rather than a Read request. The presence of a requested cacheline in a cache is referred to as a "hit," while the absence is referred to as a "miss." This is done using well-known snooping techniques, and the determination of a hit or miss for information maintained by each cache identifying the addresses of the cachelines that are currently present in that cache. As discussed above, the L2 cache is non-inclusive, making the L1 and L2 caches exclusive, meaning the same cacheline will not be present in both of the L1 and L2 caches for a given core. Under an operation 1a, core agent 408 sends an RFO message with snoop (RFO/S) 422 to L1 cache agent 412, which results in a miss. During an operations 1b, L1 cache agent 412 the forwards RFO/snoop message 422 to L2 cache agent 416, resulting in another miss.

In addition to snooping a core's local L1 and L2 caches, the core will also snoop L3 cache 108. If the processor employs an architecture under which the L3 cache is inclusive, meaning that a cacheline that exists in L1 or L2 for any core also exists in the L3, the core knows the only valid copy of the cacheline is in system memory if the L3 snoop results in a miss. If the L3 cache is not inclusive, additional snoops of the L1 and L2 caches for the other cores may be performed. In the example of FIG. 4a, L2 agent 416 forwards RFO/snoop message 422 to L3 cache agent 420, which also results in a miss. Since L3 is inclusive, it does not forward RFO/snoop message 422 to cache agents for other cores.

In response to detecting that the requested cacheline is not present in L3 cache 108, L3 cache agent 420 sends a Read request 424 to memory interface 106 to retrieve the cacheline from system memory 113, as depicted by an access operation 1d that accesses a cacheline 426, which is stored at a memory address 428. As depicted by a copy operation 2a, the Read request results in cacheline 426 being copied into a cacheline slot 430 in L3 cache 108. Presuming that L3 is full, this results in eviction of a cacheline 432 that currently occupies slot 430. Generally, the selection of the cacheline to evict (and thus determination of which slot in the cache data will be retrieved from and written to) will be based on one or more cache eviction algorithms that are well-known in the art. If cacheline 432 is in a modified state, cacheline 432 will be written back to memory 113 (known as a cache write-back) prior to eviction, as shown. As further shown, there was a copy of cacheline 432 in a slot 434 in L2 cache $118_1$, which frees this slot. Cacheline 426 is also copied to slot 434 during an operation 2b.

Next, cacheline 426 is to be written to L1 data cache $116_{1D}$. However, this cache is full, requiring an eviction of one of its cachelines, as depicted by an eviction of a cacheline 436 occupying a slot 438. This evicted cacheline is then written to slot 434, effectively swapping cachelines 426 and 436, as depicted by operations 2c and 2d. At this point, cacheline 426 may be accessed (aka consumed) by core $114_1$.

Oftentimes, as described above with reference to FIG. 2, a first NFV appliance (the producer) will generate data corresponding to a first object (e.g., modify the first object), and subsequently a second NFV appliance (the consumer) will want to access the object. In one case, multiple NFV appliances may want to simply read that same object's data. An illustration of an example of how this is done under a conventional approach is shown in FIG. 4b.

At the start of the process, there are three copies of cacheline 426—one in memory 113, one in slot 430 of L3 cache 108 and the other in slot 434 of L1 data cache $116_{1D}$. Cacheline 430 holds data corresponding to a data object. (For simplicity, only a single cacheline is shown; in practice, the data for a data object will generally span multiple cachelines.) The consumer, executing on Core 2, desires to access the data object, which it knows is located at memory address 428 (per corresponding software object code executing on Core 2).

As further depicted in FIG. 4b, L3 cache agent 420 maintains information of each cacheline it stores relating to the state of the cacheline and which cores have copies of the cacheline. In one embodiment, core valid (CV) bits are used to indicate which core(s) have a valid copy of the cacheline. When cacheline 426 is copied to L3 cache 108, its cacheline status data is set to indicate that cacheline 426 is in the (E)xclusive state, and the CV bits indicate Core 1 has the only valid copy of the cacheline, as depicted by cacheline status data $440_{S1}$. Subsequently, producer 200 modifies the data object, resulting in the state of cacheline 426 being updated to (M)odified state $426_{S1}$. In accordance with conventional cache coherency schemes and cache eviction policies, the modified copy of the cacheline is not written to L3 cache 108 at this point.

Core 2 agent 410, will send out a Read request 442 along with a cache snoop to determine whether cacheline 426 is present in either its L1 data cache $116_{2D}$ or its L2 cache $118_2$, or L3 cache 108. As depicted by operations 1a and 1b, core agent 410 sends a first cache snoop to L1 cache agent 414 requesting access to cacheline 426 (e.g., Read request 422), resulting in a miss, and the snoop is forwarded to L2 cache agent 418, resulting in a second miss. As before, the Read request message with snoop is forwarded from the L2 cache agent (418) to L3 cache agent 420.

L3 cache agent 428 checks to see if a copy of cacheline 426 is present in L3 cache 108, resulting in a hit. L3 cache agent 428 the checks cacheline status data $440_{S1}$ and determines the Core 1 has exclusive ownership of cacheline 426. Since a cacheline in an exclusive state can be modified by its owner, it is possible that cacheline 426 has been modified (in this case it has), and thus the copy of cacheline 426 held by L3 cache 108 is not current. Accordingly, L3 cache agent 420 sends the read request to the L1 and L2 cache agents for Core 1, as depicted by operations 2a and 2b eventually being serviced by L1 cache agent 412.

In response to receiving Read request 442, a copy of modified cacheline 426 will be forwarded from L1 data cache $116_{1D}$ to L1 data cache $116_{2D}$ via interconnect 112 and written to a slot 444, as depicted by an operation 3. In addition, each copy of cacheline 426 in L1 data cache $116_{1D}$ and L1 data cache $116_{2D}$ will be marked as (S)hared, as depicted by cacheline states $426_{S2}$. For simplicity, existing cachelines in one or more of L1 data cache $116_{2D}$ and L2 cache $118_2$ that might be evicted as a result of copying cacheline 426 are not shown, but similar results to those illustrated in FIG. 4a and discussed above may be expected if L1 data cache $116_{2D}$ and L2 cache $118_2$ are full.

In connection with operation 3, the copy of cacheline 426 in L3 cache 108 is also updated to reflect the modified data in cacheline 426. Additionally, the cacheline 426 status data is updated to reflect that cacheline 426 is now shared by both Core 1 and Core 2, as depicted by cacheline status data $440_{S2}$.

Each snoop has an associated cycle cost accruing latency, and consumes bandwidth on the processor's interconnects.

Moreover, while a processor core is waiting for access to its requested data, processing of the thread requesting the access is stalled.

Figure 6:
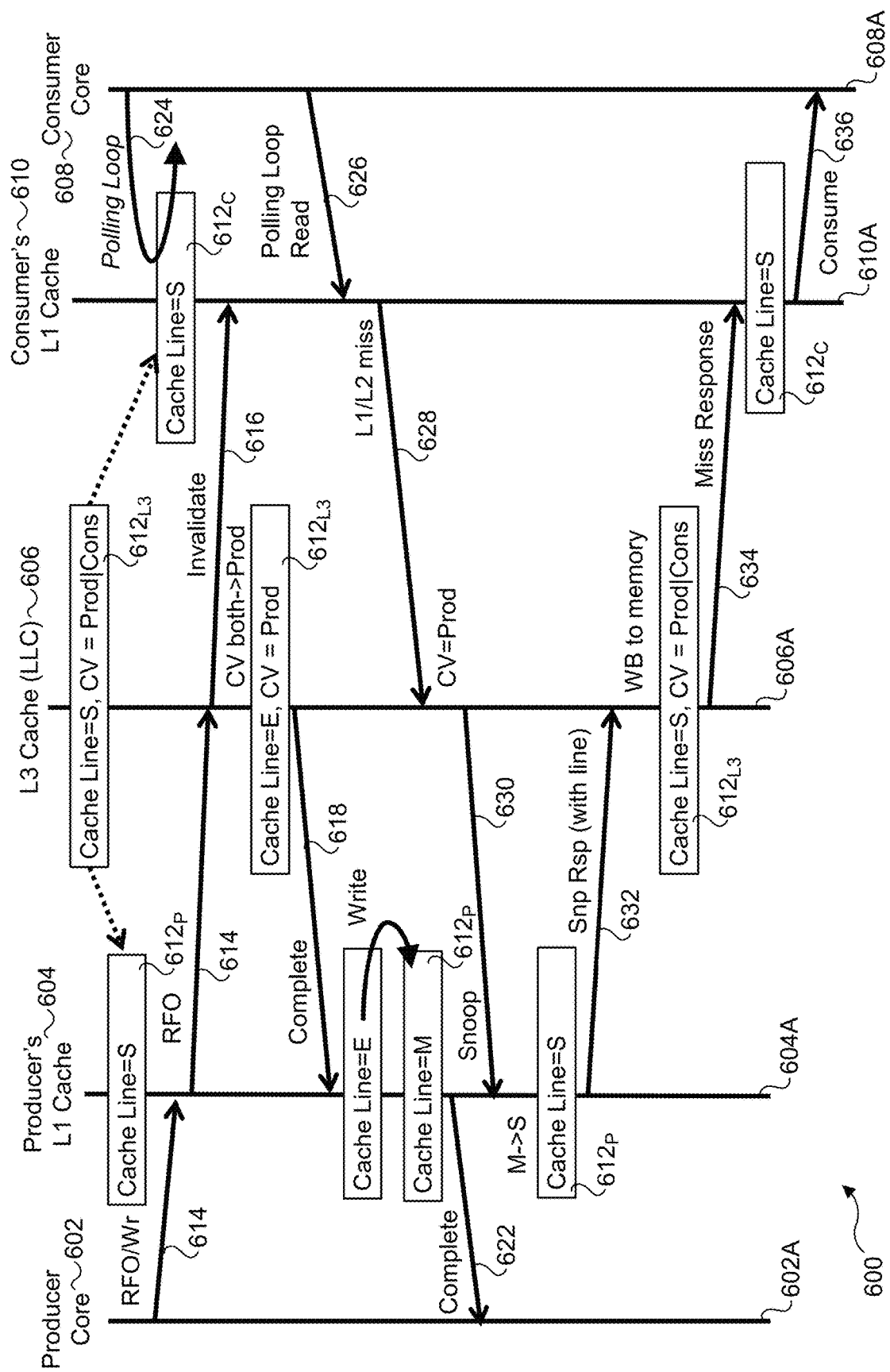
FIG. 6 is a message flow diagram illustrating a producer core assessing a cacheline held in an L3 cache and modifying it, and a consumer core accessing the same cacheline after the cacheline has been modified, under a conventional approach.

A more complex memory access sequence is illustrated in FIG. 6, which shows a message flow diagram 600 implemented on a computer platform comprising a producer core 602 including a producer's L1 cache 604, an L3 cache (e.g., LLC) 606, and a consumer core 608 having a consumer's L1 cache 610. Each of these components has a respective agent, as depicted by agents 602A, 604A, 606A, 608A, and 610A. In FIG. 6, L2 caches are not shown since in this example the copies of the cacheline are in the L1 caches.

At an initial state, there are three copies of a cacheline 612 that are currently cached in producer's L1 cache 604, L3 cache 606, and consumer's L1 cache 610, respectively depicted as cachelines $612_P$, $612_{L3}$, and $612_C$. Each of cachelines $612_P$ and $612_C$ are marked as (S)hared, while cacheline $612_{L3}$ includes cacheline status data identifying cacheline 612 is shared and each of the producer core and the consumer core hold a valid copy of the cacheline.

As shown, producer core 602 desires to gain ownership of a shared cacheline 602 so it can modify it. For example, if produce core 602 desires to modify its copy (cacheline $612_P$) of cacheline 612 by writing to it, it must first obtain ownership of the cacheline. To obtain ownership of cacheline 612, the producer core's agent 602A sends a Read For Ownership (RFO) (Wr)ite request 614 to agent 604a for consumer's L1 cache 604. RFO 614 is forwarded by the agent to agent 606A for L3 cache 606. In response to receiving RFO 614, agent 606A and sends an invalidate message 616 to the consumer's L1 cache agent 610A, and updates its cacheline $612_{L3}$ status data to indicate the cacheline is now in the (E)xclusive state, identifying the producer core 602 as the exclusive owner of cacheline 612. Upon receipt of invalidate message 616, agent 610A will mark cacheline $612_C$ as (I)nvalid (not shown).

Agent 606A for L3 cache 606 returns a complete message 618 to agent 604A for producer's L1 cache 604. Upon receipt, cacheline $612_P$ is marked as (E)xclusive. Data is then written to cacheline $612_P$ (as depicted by a Write 620), and cacheline $612_P$ is marked as (M)odified. Agent 604A then returns a complete message 622 to producer core 602's agent 602A, completing the Write transaction.

Asynchronously, agent 608A for consumer core 608 periodically polls the status of cachelines in consumer's L1 cache 610, as depicted by a polling loop 624. Subsequently, agent 608A attempts to read its copy of cacheline 612 (cacheline $612_C$) using a polling loop read 626. Since at this point cacheline $612_C$ is marked (I)nvalid, this results in an L1/L2 cache miss, and agent 610A for consumer's L1 cache 610 sends a message 628 to agent 606A identifying producer core 602 as holding the valid cacheline, as identified by a corresponding CV bit. Agent 606A then sends a snoop 630 with the read request to agent 604A. In response, the state of cacheline $612_P$ is changed from (M)odified to (Shared), and a snoop response 632 including a copy of cacheline $612_P$ is returned to agent 606A.

Upon receiving snoop response 632, agent 606A performs a memory write-back (WB) of the cacheline, and returns the status of its copy ($612_{L3}$) to (S)hared, and appropriate CV bits are set to once again identify that producer core 602 and consumer core 608 hold valid copies of the cacheline. Subsequently, a cacheline miss response 634 including the modified copy of cacheline 612 is received by agent 610A, which is used to overwrite the data in cacheline $612_C$, and mark cacheline $612_C$ as (S)hared. Once in the consumer's L1 cache, the consumer core 608 consumes the cacheline, as depicted by a consume operation 636.

When the foregoing cacheline access sequence was tested as a producer/consumer baseline transaction on one class of processor, it took 112 processor cycles just to complete the read request. That is a significant amount of overhead, with a large amount of traffic being sent between the various agents to facilitate the transaction while maintaining cache coherency. These operations cause longer latency for each memory access of producer-consumer workload, as in inter-VM communication. As a result, testing has shown the processor is stalled for more than 50% of its cycles (i.e., >50% of CPU cycles are spent without retiring instructions).

Ideally the producer could use a pushing-store instruction to push the data into consumer's MLC to save latency. However this approach requires the software to always know the target MLC, which can potentially be impractical, especially with frequent VM migration. Also the pushing operation may evict useful data in the consumer MLC due to the MLC's limited capacity.

To achieve good performance gain without having to foot the complexity, a new memory instruction, called CacheLine LLC Allocation (CLLA), is envisioned. The CLLA instruction immediately allocates the cache line into the LLC from the producer's MLC, so that the consumer can access the data directly from the LLC to reduce the memory reference latency. The CLLA instruction allows the software to provide application level knowledge to hardware for optimizations. By proactively pushing data to the LLC that is closer to the consumer, the communication latency is reduced by more than 2×, thus improve performance, as well as reduce the number of coherence messages (avoid consulting SF) to save energy.

Figure 7:
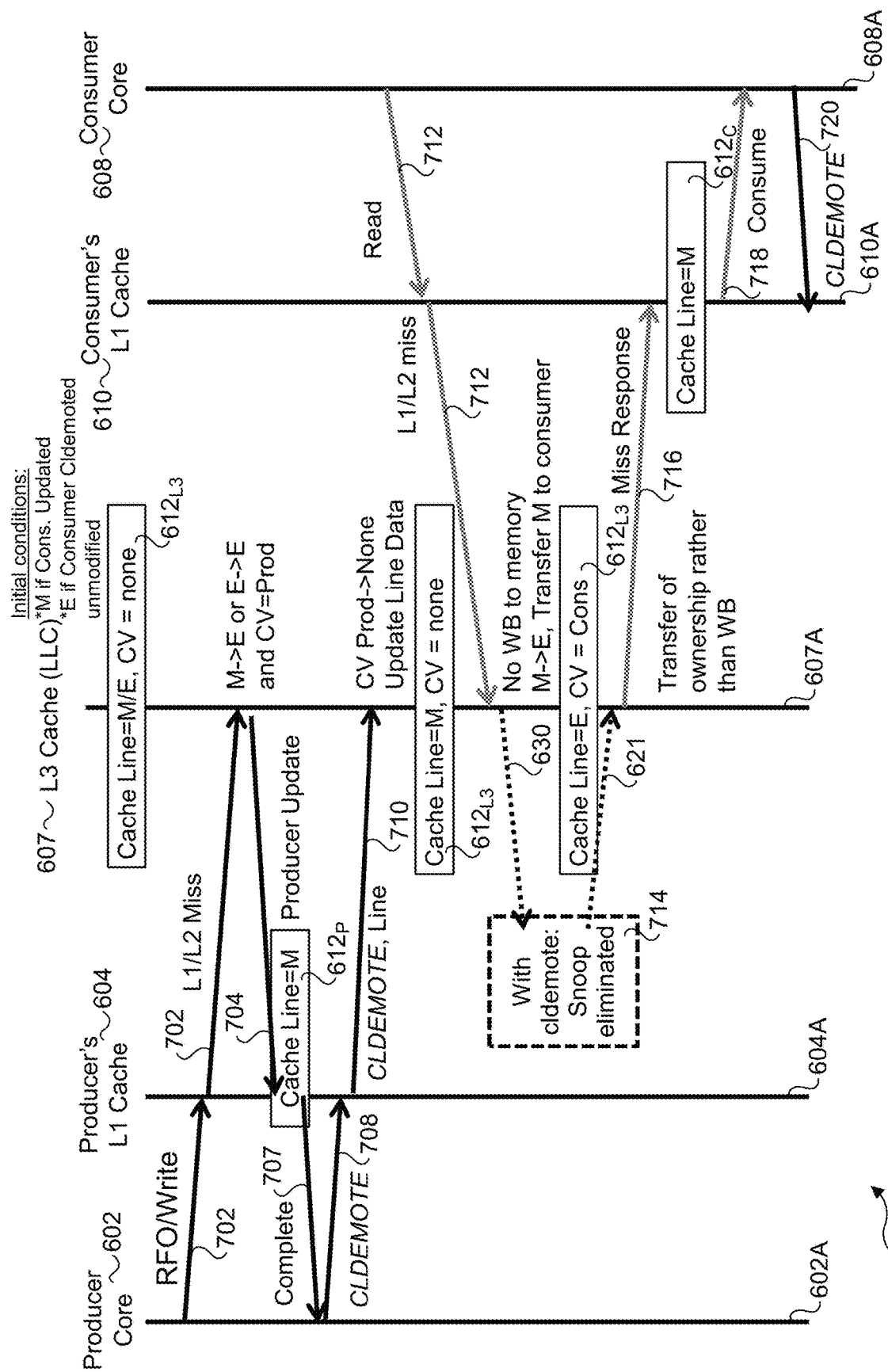
FIG. 7 is a message flow diagram illustrating a similar cacheline access by the producer core and consumer core under which cacheline demotion is used, according to one embodiment.

FIG. 7 shows a message flow diagram 700 corresponding to a similar pair of Write and Read transactions originating from producer core 602, and consumer core 608, respectively, that were performed in message flow diagram 600 of FIG. 6. Messages are passed between the same agents in both message flow diagrams. As a starting condition, there is a copy of cache line 612 in L3 cache 606, as depicted by cacheline $612_{L3}$. The initial state of cacheline $612_{L3}$ is either (M)odified, if the consumer's copy of cacheline 612 has been updated, or (E)xclusive if the consumer's copy had been CLDemoted unmodified. The CV is none, indicating there is no copy of cacheline present in either producer's L1 (or L2) cache 604 or consumer's L1 (or L2) cache 610.

As before, agent 602A for producer core 602 sends a RFO/Write message 702 to agent 604A, which results in an L1/L2 miss. In response, agent 604A forwards RFO/Write message 702 to agent 606A for L3 cache 606, which has a copy of the requested cacheline (cacheline $612_{L3}$). Depending on the initial state, the state for cacheline $612_{L3}$ is either transitioned from (M)odified to (E)xclusive, or remains (E)xclusive. The CV bits are updated to identify producer core 602 has the only valid copy of the cacheline. A copy of cacheline $612_{L3}$ is returned by agent 606A to agent 604A via a message 704, as depicted by cacheline $612_P$. This copy is the updated by the producer's Write, and marked as (M)odified, followed by a complete message 706 returned to agent 602A.

Under the conventional approach, cacheline $612_P$ would remain in producer's L1 cache 604 until it was evicted. However, under this embodiment, the application that has modified the cacheline includes a CLLA instruction to demote cacheline $612_P$. Accordingly, in conjunction with execution of the CLLA instruction, a CLDEMOTE message 708 is sent by agent 602A to agent 604A to demote cacheline $612_P$ to L3 cache 606. In response to receiving CLDEMOTE message 708, agent 604A evicts cacheline $612_P$ and forwards the cacheline to agent 606A, which overwrites (updates) the existing data in cacheline $612_{L3}$, and marks the cacheline as (M)odified. The CV bit for the producer core is reset to reflect there are cores holding a valid copy of the cacheline.

In a similar manner to above, agent 608A of consumer core 608 sends a Read request 712 to agent 610A identifying cacheline 612. The lookup of cacheline 612 results in a miss (for both of the consumers L1 and L2 caches), and agent 610A forwards Read request 712 to agent 606A. Since the modified version of cacheline $612_P$ was demoted using the CLLA instruction, the modified copy of the requested cacheline 612 is already in cacheline $612_{L3}$. As a result, snoop message 630 and snoop response 632 are eliminated, as depicted by block 714.

In response to Read request 712, agent 606A returns a copy of the modified cacheline $612_{L3}$ in a miss response message 716 to agent 610A. This copy of the modified cacheline is then written to a cacheline slot in consumer's L1 cache 610, as depicted by a cacheline $612_C$ with a status marked as (M)odified. Cacheline $612_C$ is then retrieved from consumer's L1 cache 610 to be consumed by consumer core 608, as depicted by a consume operation 718. If the application running on consumer core 608 knows it will only be reading a cacheline, it can proactively demote it with the CLLA instruction, as depicted by a CLDEMOTE message 720.

Returning to cacheline $612_{L3}$, in the embodiment illustrated in FIG. 7, there is no write-back to memory, even though the data in cacheline $612_{L3}$ has been modified. The state of cacheline $612_{L3}$ is marked as (E)xclusive, with CV set to the consumer, transferring ownership of the cacheline to consumer's L1 cache 610 rather than performing a write-back to memory.

Using proactive cacheline demotion with the CLLA instruction, latencies associated with memory transaction can be significantly reduced. For example, under message flow diagram 700, the number of processor cycles for the consumer Read memory access is reduced to 48 cycles.

There are various ways to employ the new CLLA instruction, which is implemented at the machine level (e.g., as a machine-level instruction). Under one approach, instructions may be implemented in source code that would result in generations of CLLA machine instructions when compiled. For example, under C or C++ the following function could be used:

void_mm_clla(Item *p)

where p is a pointer to the address of the data object (Item) for which cachelines are to be demoted using the CLLA machine instruction. During execution of the object code generated by the C/C++ compiler, the processor hardware uses the address specified to select the proper cache line(s) to demote. Hardware may optionally transparently combine CLLAs that are redundant to save time and power.

Preferably, the programmer would use a CLLA source-level instructions when access to a data object by a given application or thread has been completed. For example, in the context of a NFV appliances, packets are typically processed by accessing field in the packet headers. Once a given NFV appliance is done with its task, the same packets (possibly with revised packet headers and/or shared packet-processing application data) is accessed by a next NFV appliance in the processing chain, wherein NFV appliances up the chain are producers that produce data that is con-sumed by consumers down the chain. It is preferable that the producer should finish updating the whole cacheline then push it to L3 cache/LLC, for the consumer to consume. The software can decide when to call the instruction in this case.

As a second option, a source-level compiler can be modified to examine memory access patterns, and detect when last accesses to data objects in memory for a given thread or process occur, and insert CLLA machine-level instructions in the object code generated by the compiler. In addition to data patterns, the compiler can look at specific source-level instructions, such as "delete" in C++11, which releases memory allocated for data objects, or execution of a C++ destructor, which also will releases such memory.

Under another approach, a smart compiler is configured to examine memory access patterns in object code and modify object code to add CLLA instructions. This approach can be further enhance through manual insertion of CLLA instructions in the object code.

For the smart compilers at the source code level, the software coder could add pragmas or something similar to direct the compiler to generate CLLA instructions for certain sections of code (or could be applied globally). Optionally, or in addition, the source code may include hints to instruct the compiler to consider generating CLLA instructions. For an implementation without hints, the compiler would look for last accesses for a given data object by a given thread. For instance, there is a lot of queueing involved with packet processing, as an example application, such as putting packet headers in queues. When work on a packet header is complete, the queue is advanced (typically using circular FIFOs). Advancement of a FIFO head could trigger generation of CLLA instructions for cachelines relating to one or more of the data objects in the FIFO slot that is dequeued. More accurately, the FIFOs typically contain pointers to the larger packet header data structures that are stored in memory; however, for properly designed code, defueling of the pointer may also delete that data object pointed to by the pointer.

Multi-Socket NUMA Implementation

Figure 8:
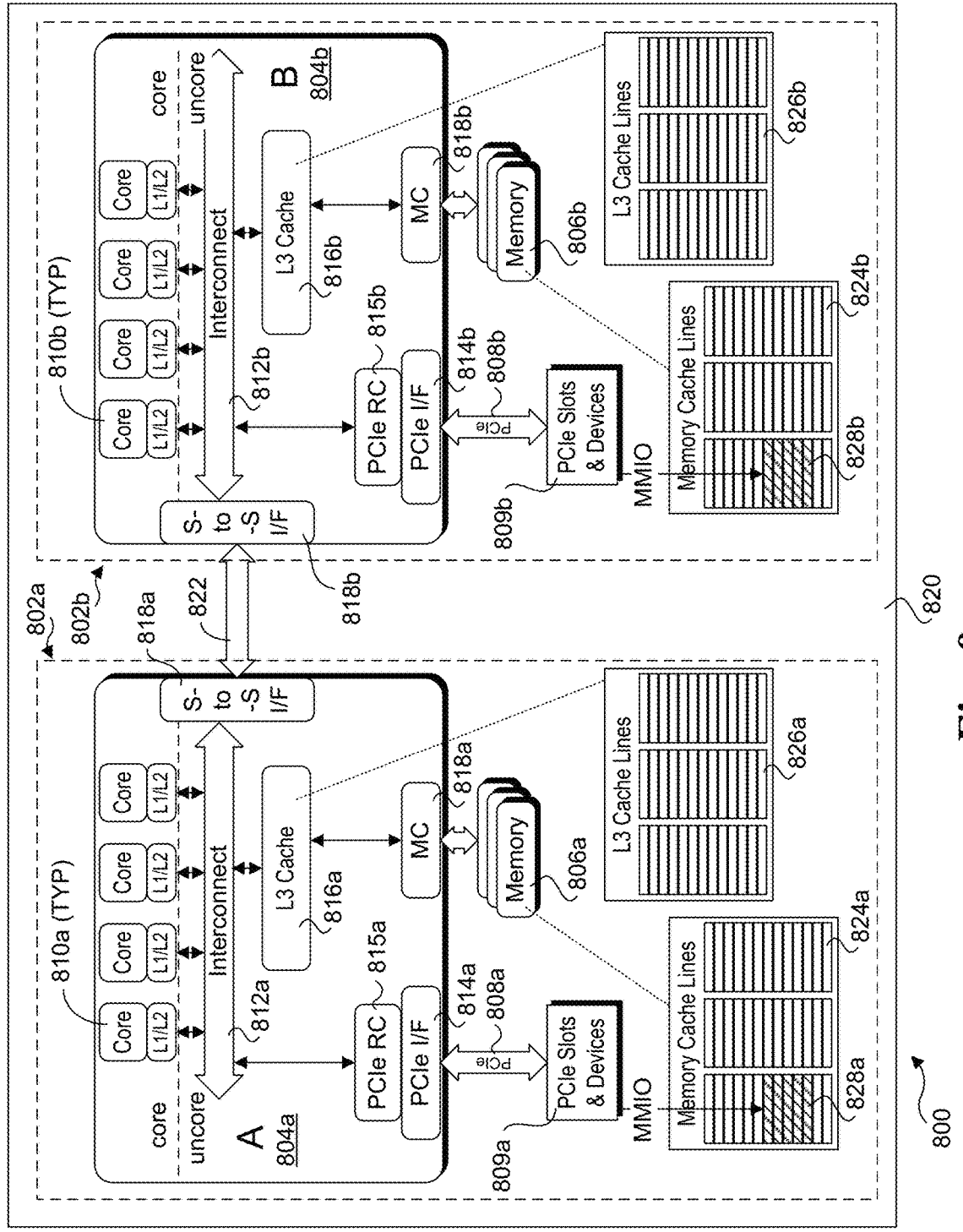
FIG. 8 is a schematic diagram of a dual-socket platform employing a NUMA architecture.

One of today's common platform architectures that is deployed in data centers and the like is a Non-Uniform Memory Access (NUMA) multi-processor platform architecture. FIG. 8 illustrates a dual-"socket" NUMA multi-processor platform architecture 800 employing two NUMA nodes 802a and 802b, also labeled 'A' and 'B'. For simplicity and convenience, reference to nodes herein may be to their letter label rather than their reference number. In addition, reference to a component that is common across nodes will be made to the base reference number, while a letter 'a', will be added to the reference number in the drawing Figures to identify that component on a particular node. For example, each of nodes A and B include a processor 804, which is labeled 104a for the processor for node A and 804b for the processor for node B. The NUMA nodes may also be referred to as sockets.

In addition to a processor 804, each node includes system memory 806, and a PCIe interconnect 808 coupled to one or more PCIe slots and/or PCIe device, as collectively depicted by PCIe slots and devices 809. Each processor 804 includes a core portion including a plurality of processor cores 810, each including an L1 and L2 (or MLC) cache.

In the illustrated embodiment, the remaining portion of the processor is referred to as the uncore, and includes various interconnect circuitry and interfaces for connecting various functional blocks on the processor in communication. For simplicity this interconnect circuitry is depicted as an interconnect 812; however, it will be understood that interconnect 812 may be representative of one or more interconnect structures, such as buses and single or multi-lane serial point-to-point, ring, or mesh interconnect structures. A portion of the uncore circuitry is configured to handle many of the North-bridge functions under the legacy North-bridge/South-bridge architecture, including memory control and PCIe interfaces for devices such as NICs. Corresponding exemplary functional blocks depicted in the processor uncores in FIG. 8 include a PCIe interface (I/F) 814, a PCIe Root Complex (RC) 815, an L3 cache 816, a memory controller (MC) 817, and a socket-to-socket interconnect interface (S-to-S I/F) 818. In addition to these illustrated blocks, each processor 804 would include many other functional blocks that are not shown for clarity.

Each of processors 804 is operatively coupled to a printed circuit board called main board 820 via a socket, or otherwise coupled to the main board via a direct coupling technique, such as flip-chip bonding. In either case, it is common practice to refer to the processors themselves as sockets, and thus the usage of the terminology socket-to-socket interconnects and interfaces for coupling processor nodes in communication. Main board 120 includes electrical wiring (e.g., traces and vias) to facilitate electrical connections corresponding to the physical structure of various interconnects depicted in FIG. 8. These interconnects include PCIe interconnects 808 between PCIe interfaces 814 and PCIe slots and devices 809, and a socket-to-socket interconnect 822 coupled between socket-to-socket interconnect interfaces 818a and 818b. In one embodiment, socket-to-socket interfaces 818a and 818b employ the Intel QPI protocol and wiring structure.

As further shown in FIG. 8, the system memory 806 for each socket includes an address space 824 in which memory cache lines are stored. As before, the memory space for an L3 cache 116a includes L3 cache lines 826.

Under a NUMA architecture, processors (and processor cores) are enabled to access different memory resources distributed across the platform. The memory resources may be considered local memory resources (e.g., memory resources on the same node as a processor or core) or remote memory resources (e.g., memory resources on other nodes). For example, under the viewpoint of node 802a, system memory 806a comprises a local memory resource, while system memory 806b comprises a remote memory resource. Under another type of NUMA architecture (not depicted herein), remote memory resources may also be shared between processors while not being associated with a particular processor or node. Since, for a given node, local memory resources are operatively coupled to a processor, while remote memory resources are not, the access to the local memory resources relative to the remote memory resources is not the same (e.g., the access is non-uniform). Moreover, it is preferable to employ local memory resources when available.

Under platform architecture 800, software running on a processor core in one node may be allocated memory address space in system memory nominally associated with another node. Accordingly, under some embodiments the address space for a portion of the memory resources for a platform may be managed as a single global pool, with unique addresses for each memory address location within the pool. Additionally, a portion of the address space may be considered local address space that employs local addressing (e.g., address space allocated to an operating system), while another portion may be addressed using global addressing.

In accordance with another aspect of NUMA architectures, network ports (and thus associated NICs) may be assigned to software application that are running on processors (or processor cores) that are on nodes that are different than the node associated with the assigned port. When the memory allocated to the software application is on the same node as the processor, the NIC receiving the packets and the destined memory resource in which the packet data is to be written are on separate nodes.

Figure 8A:
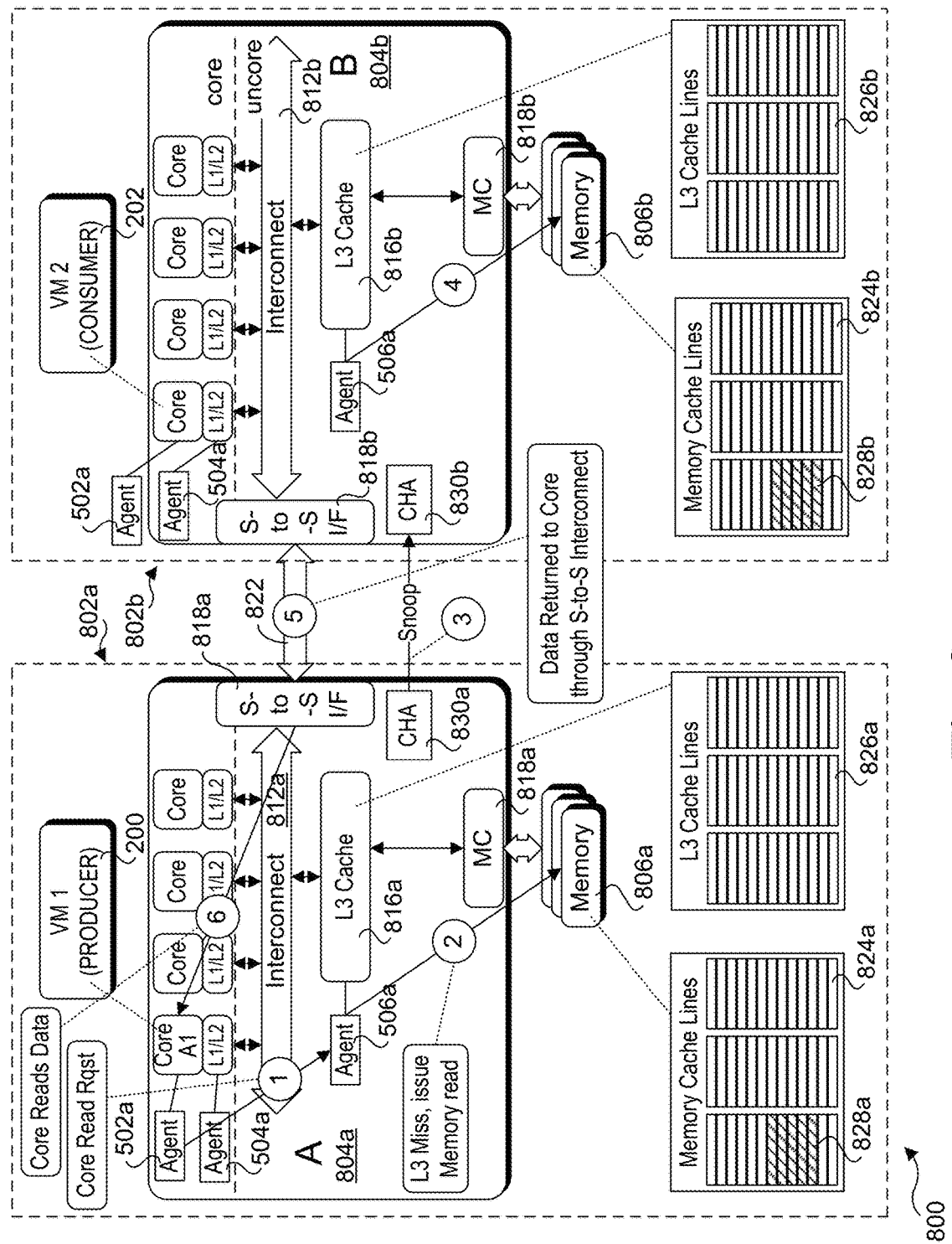
FIG. 8a is a schematic diagram illustrating how a cacheline on a remote socket is accessed under a conventional approach.

FIG. 8a illustrates an exemplary memory read in a NUMA platform architecture 800 under which the requesting core and the requested memory are on a different nodes. FIG. 8a further depicts some agents that help facilitate the read memory transaction, including a core agent 602a, an L1 cache agent 604a, and L3 cache agents 606a. The NUMA platform architecture further includes a pair of caching home agents (CHAs) 830a and 830b.

The memory read transaction begins with software instructions for a producer 200 running on core A1 in node A sending out a read request to access a memory cacheline 832 in the address space of memory 806b on node B. As before, this read request would be sent from core agent 602a to L1 cache agent 604a, and if an L1/L2 miss occurred, L1 cache agent 604a would forward the read request to L3 cache agent 606a. This is collectively depicted as an operation 1. In this example, both L1/L2 and L3 misses resulted, and in response, L3 cache agent 606a issues a memory access request to memory controller 817a, as depicted in a second operation 2. This again results in a miss.

As a result of this miss, the read request is forward internally to CHA 830a on node A, which sends a snoop with the read request to CHA 830b on node B, as depicted by an operation 3. Although shown as a direct connection, the snoop/read request would actually be forwarded via socket-to-socket interconnect 822. In addition, if there are multiple remote sockets, the CHA on the requesting node may send the snoop and read request to each of the CHAs on the other sockets. Upon receiving the snoop/read request, CHA 830b would forward the request internally to agent 606a on Node B, and agent 606a would issue a memory read access to memory controller 817b, as depicted by an operation 4. In this example, since the requested cacheline (832) is in memory 806b, a copy of the cacheline would be retrieved from memory 806b and returned to Core A1. The data return path includes, in part, forwarding the data over socket-to-socket interconnect 822, as depicted by an operation 5. Upon being forwarded the cacheline, it is stored in an available slot in the L1 cache for Core A1, and then read by Core A1, as depicted by an operation 6.

The foregoing read request doesn't even consider potentially additional complexities, such as the requested cacheline is in one or the L1/L2 caches for another core on a remote socket in an exclusive or modified state. Even so, the serial sequence of misses and the snoop across sockets results in a very long latency (e.g., more than 300 cycles per access, as measured by testing), which severely impacts performance.

In accordance with further aspects of some embodiments, two schemes are provide to proactively reduce lost cycles when accessing memory from a remote socket. These include an adaptive early snoop scheme and an adaptive remote pushing scheme. These schemes may further be combined with the cacheline demotion scheme discussed above.

Adaptive Early Snoop

Figure 8B:
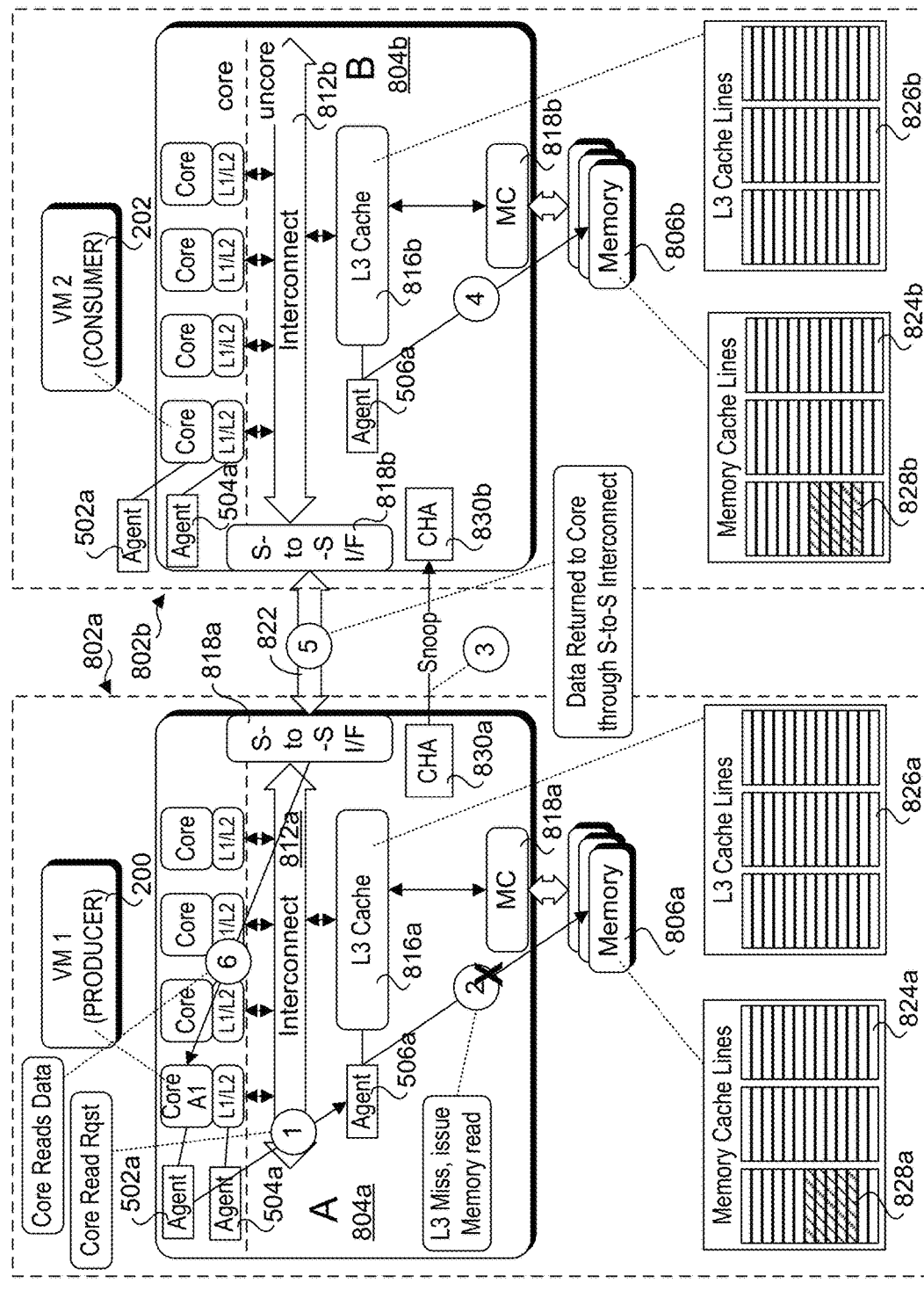
FIG. 8b is a schematic diagram illustrating how a cacheline on a remote socket is accessed using an early snooping scheme, according to one embodiment.

Under the adaptive early snoop scheme, the cacheline access pattern is monitored by applicable agents, and an early snoop is issued when the access pattern indicates that the data is more-likely residing in a remote socket instead of local memory (or a cache) on the same socket. "Early" snoop means the snoop forwarded from the local socket to the remote socket is (proactively) issued earlier than it would be under the conventional scheme, as illustrated in FIG. 8*b*.

As before, during operation 1, the Read request is forwarded to L3 cache agent 506*a* after the L1/L2 misses. However, rather than perform operation 2, L3 cache agent 506*a* immediately forwards the request to CHA 830*a*, thus enabling the snoop in operation 3 to be performed earlier than it is performed under the conventional approach depicted in FIG. 8*a*.

Figure 9:
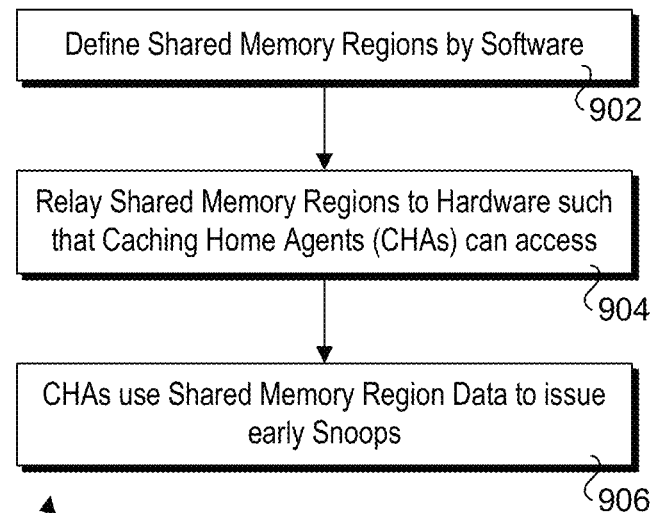
FIG. 9 is a flowchart illustrating operations employed to implement early snooping for shared memory regions, according to one embodiment.

There are several different ways that potentially can be used to monitor and obtain the cache access pattern. Under one approach, the shared memory regions are defined by software and this information is relayed to hardware and made available to a CHA, and the CHA monitors certain memory regions and issues early snoops, accordingly. This approach is depicted by the operations in a flowchart 900 in FIG. 9. In a block 902, the shared memory regions are defined by software. For example, the software can define certain regions of the virtual global memory space as shared for the multi-socket platform, enabling multiple software applications running on cores on different sockets access to data objects within the shared memory regions.

In a block 904, the shared memory regions are relayed to the platform processor hardware such that this information can be accessed by the CHAs. For example, the shared memory regions could be identified by tags or bit in page tables that are used to map virtual memory address to physical memory addresses. The CHAs then use the shared memory region data to issue early snoops, as shown in a block 906.

A second approach is to include a tag in a cacheline to indicate the cacheline's access pattern. If the cacheline is consistently served from a remote socket, the tag would be updated to indicate the pattern, and the next time when the data request for the cacheline misses the local LLC, the socket's CHA would issue an early snoop of the remote socket.

Figure 10:
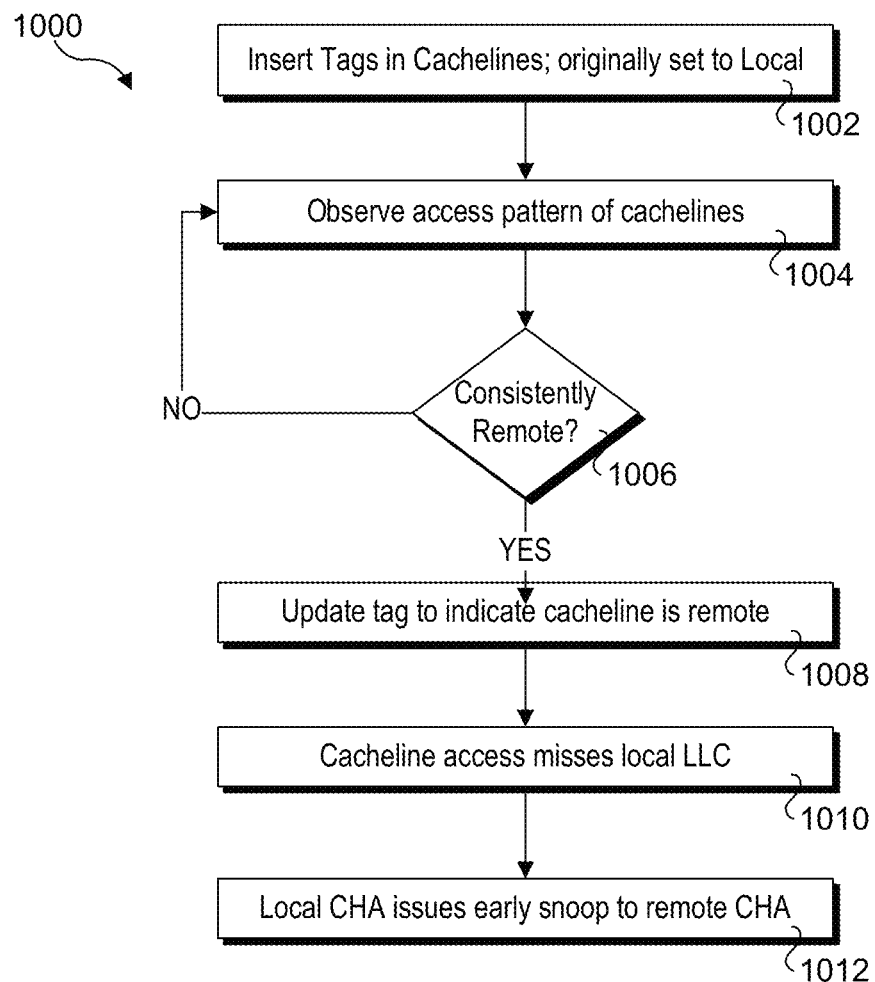
FIG. 10 is a flowchart illustrating operations and logic for implementing an early snooping scheme under which employs tags in cachelines, according to one embodiment

Corresponding logic and operations for implementing this approach are shown in a flowchart 1000 in FIG. 10. In a block 1002 tags are inserted in cachelines, initially indicating the cachelines are local. In a block 1004, the access patterns of cachelines are observed. For example, this could be done by the CHAs in combination with the LLC cache agents. In a decision block 1006 a determination is made to whether a given cacheline is consistently being served via a remote socket. If the answer is YES, the logic proceeds to a block 1008 in which the tag is updated to indicate the cacheline is remote. Subsequently, in a block 1010 a cores access request to its local LLC results in a miss. In response, the local CHA issues an early snoop to the remote CHA.

Yet another approach is to use a Bloom filter to monitor the access pattern of cachelines. Under this technique, one or more Bloom filters would be used to track the access pattern to a remote socket and provide hints if early snoop should be issued.

In further detail, a Bloom filter is a space-efficient data structure that is used to test probabilistically whether an element is a member of a set. The simplest form of Bloom filter employs a single hash algorithm that is used to generate bit values for a single row or column of elements at applicable bit positions, commonly referred to as a single-dimension bit vector. Another Bloom filter scheme employs multiple hash algorithms having bit results mapped to a single-dimension bit vector. Under a more sophisticated Bloom filter, the bit vectors for each of multiple hash algorithms are stored in respective bit vectors, which may also be referred to as a multi-dimension bit vector.

An example of a Bloom filter that is implemented using multiple hash algorithms with bit values mapped into a single-dimension bit vector is shown in FIGS. 11*a*-11*c*. In this example, there are three hash algorithms, depicted as $H_1(x)$, $H_2(x)$ and $H_3(x)$, where element x is the input value. For a given input $x_1$, the result for each of hash algorithms $H_1(x_1)$, $H_2(x_1)$ and $H_3(x_1)$ is calculated, and a corresponding bit is marked (e.g., set to 1) at the bit position corresponding in the hash result. For example, as shown in FIG. 11*a*, the result of hash function $H_1(x_1)$ is 26, $H_2(x_1)$ is 43, and $H_3(x_1)$ is 14. Accordingly, bits at positions 26, 43, and 14 are set (e.g., the bit values are flipped from '0' (cleared) to '1' (set)). This process is then repeated for subsequent input $x_i$ values, resulting in the bit vector shown in FIG. 3*b*, wherein the bits that are set are depicted in gray and black. FIG. 11*b* also illustrates the result of a hit for input $x_2$ (bits depicted in black). A hit is verified by applying each of the Bloom filter's hash algorithms using $x_2$ as the input value (also referred to as a query for element $x_2$), and then confirming whether there is a bit set at the bit position for each hash algorithm result. For example, if there is a bit set for the position for each hash algorithm result, the outcome is a hit, meaning there is a high probability (depending on the sparseness of the bit vector) that the element $x_k$ corresponds to a previous input value $x_j$ for which the hash algorithms were applied and corresponding bits were set.

FIG. 11*c* shows an outcome of a miss for input $x_3$. In this case, one or more bit positions in the bit vector corresponding to the hash algorithm results are not set. FIGS. 11*b* and 11*c* illustrate a couple of features that are inherent to Bloom filters. First, Bloom filters may produce false positives. This is because the bit vector that is formed by evaluating the hash algorithms against a number of inputs x is a union of the individual results for each input x. Accordingly, there may be a combination of set bit positions that produce a hit result for a test input $x_i$ as applied against the Bloom filter's bit vector, while the input $x_i$ was not used to generate the bit vector. This is known as a false positive. Another inherent feature of Bloom filters is they do not produce false negatives. If evaluation of an input $x_i$ as applied to a Bloom filter's bit vector results in a miss, it is known with certainty that $x_i$ is not a member of the set of previous Bloom filter inputs.

FIGS. 11*a*-11*c* illustrate an example of a Bloom filter that maintains a separate table row (and one-dimensional bit vector) for each Bloom filter hash algorithm. Although each row is depicted as having the same length, it is possible that the different hash algorithms will produce bit vectors of different lengths. As hash algorithms are evaluated against input x values (e.g., against $x_1$ in FIG. 11*a*), a corresponding bit is set at the bit position for the table row corresponding to the hash algorithm result. As before, input $x_2$ results in a hit (whether a true hit or a false positive), while input $x_3$ results in a miss.

To implement a Bloom filter for tracking remote cacheline accesses, in one embodiment a hashing function on the cacheline address may be employed. Since shared data objects are typically stored in blocks of memory (e.g., memory pages), it may be advantageous to use memory page table mapping information for the Bloom filter function (which as before may be provided by the software applications themselves), where the Bloom filter "hit" test employs a lookup of a map to the memory page the cacheline belongs to. If the memory page is a remote page (i.e., stored in the physical memory address space on a remote socket), the Bloom filter data will indicate so. It is further noted that functions other than hashing functions may also be used for Bloom filters.

Adaptive Remote Pushing

Even with early snooping, the data access would still suffer the delay incurred through use of the socket-to-socket interconnect. For example, the delay for one multi-socket platform with QPI® (or KTI) socket-to-socket interconnects is approximately 60 cycles, which is much longer than LLC access latency. This long latency is responsible for much of the significant performance degradation for inter-socket communication shown in FIG. 8a.

In order to eliminate this delay, an Adaptive Remote Pushing (ARP) scheme is used to push producer data proactively to a consumer's local LLC, thus reducing the communication latency and related energy. The methods of monitoring data access pattern described above can be used to obtain the data access pattern to decide if a cacheline should be proactively pushed.

When the data is pushed to target remote socket, the ownership is released and the copy in the target socket is the most updated version. ARP requires more complex hardware/software support based on current coherency protocols. However, the return may be significant, potentially enabling the inter-socket memory access to reach a similar performance level to intra-socket memory accesses.

Figure 13:
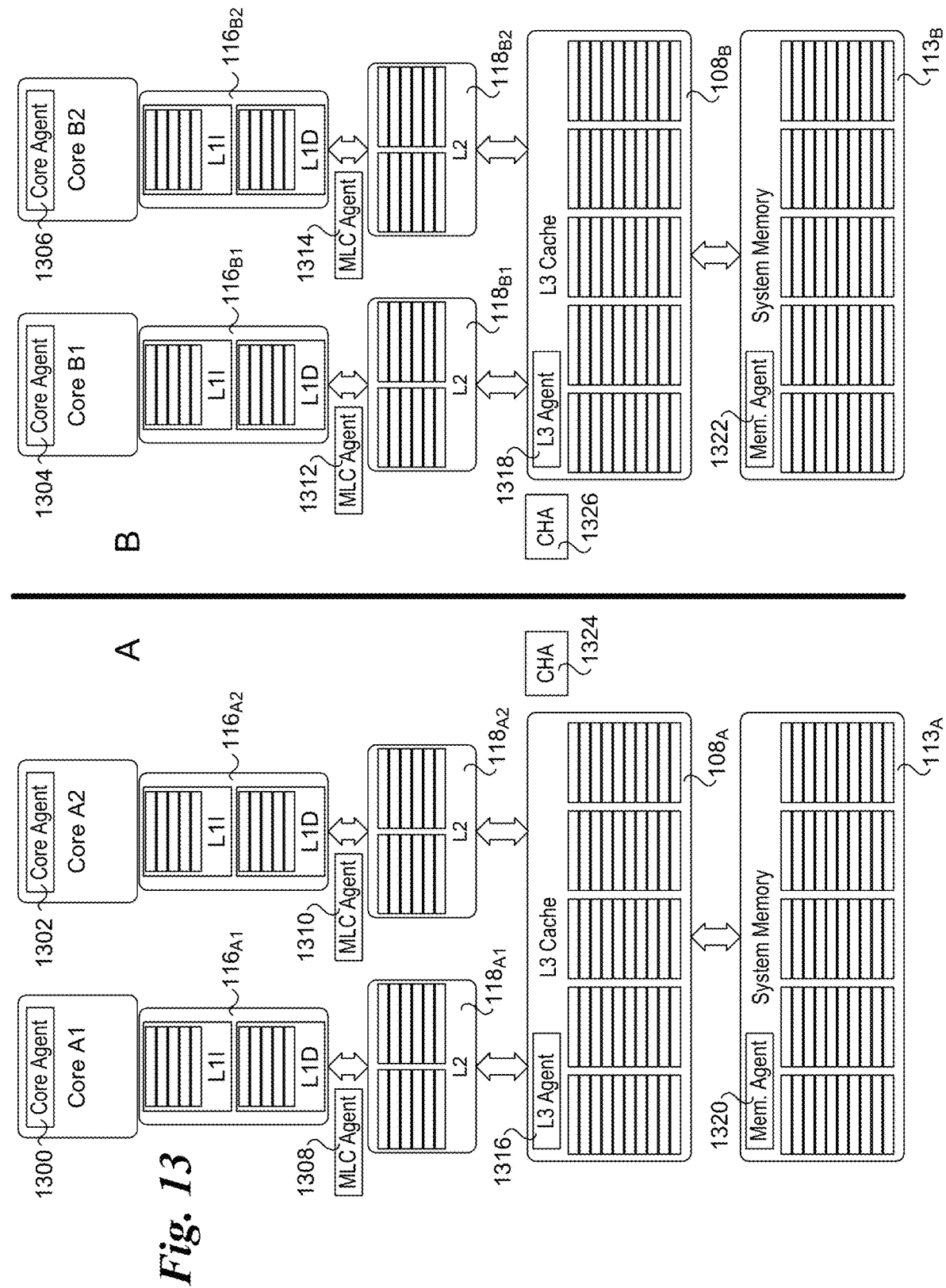
FIG. 13 is a schematic diagram illustrating a cache hierarchy for a dual-socket NUMA platform, according to one embodiment.

FIG. 13 is an abstracted diagram of a dual-socket platform focusing primarily on the caches and agents. The dual-socket platform includes sockets A and B, each with identical structure. This includes a pair of core 114, each with an L1 cache 116, an L2 cache 118. Each socket further includes an L3 cache 108 (operating as the LLC), and system memory 113. The agents depicted in FIG. 13 include core agents 1300, 1302, 1304, and 1306, MLC agents 1308, 1310, 1312, and 1314, L3 cache agents 1316 and 1318, memory agents 1320 and 1322, and CHAs 1324 and 1326.

Situations where it is beneficial to use ARP are similar to single socket uses of the CLLA instruction discussed above. For example, one use case is when a producer operating on a first NUMA node (e.g., socket B) has modified a cacheline that will be consumed by a consumer operating on a second NUMA node (e.g., socket A) without modifying the cacheline. This is schematically illustrated in FIG. 13a.

Figure 13A:
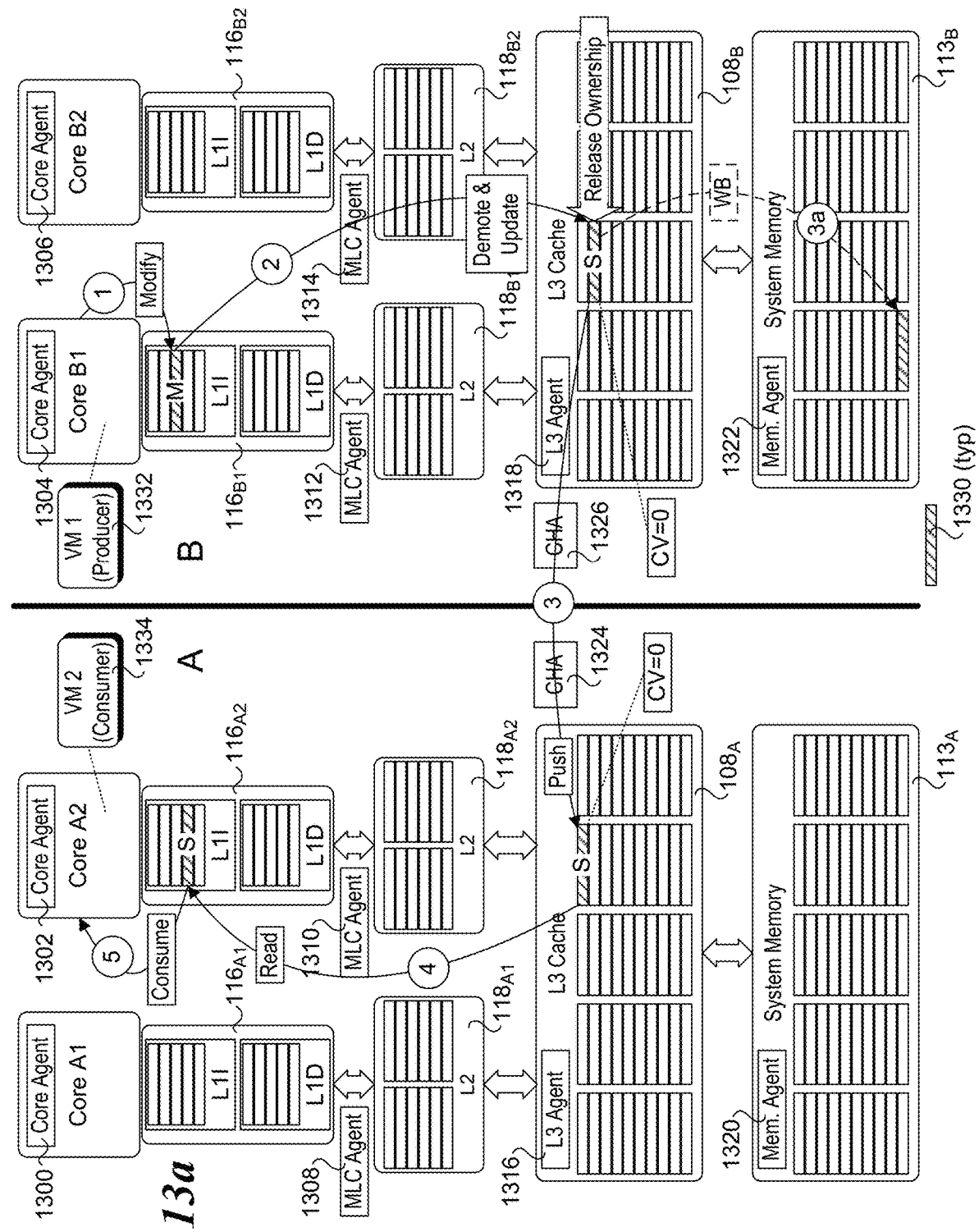
FIG. 13a is a schematic diagram illustrating a first example of demoting and pushing a cacheline to a remote socket, according to one embodiment.

At the start of the cache state shown in FIG. 13a, Core B1 holds a cacheline 1330 in its L1 data cache $116_{B1}$. A copy of cacheline 1330 is also held in L3 cache $108_B$, and system memory $113_B$. The cacheline 1330 status is (E)xclusive, and L3 cache $108_B$ indicates CV=Core B1.

During a first operation 1, a producer application 1332 hosted by a VM running on Core B1 writes to cacheline 1330 in L1 data cache $116_{B1}$, causing its status to change to (M)odified. The modified cacheline 1330 is proactively demoted to L3 cache $108_B$, which also updates copy of cacheline 1330 held in L3 cache $108_B$. At this stage, in one embodiment the ownership of cacheline 1330 (by Core B1) is released, and a copy of cacheline 1330 is pushed via CHAs 1326 and 1324 over the socket-to-socket interconnect (not shown) into L3 cache $108_A$, as depicted by an operation 3. The copies of cacheline 1330 in each of L3 caches $108_A$ and $108_B$ is marked as (S)hared, and CV is set to 0, indicating cacheline 1330 is not owned by any core. Optionally, a copy of cacheline 1330 is written back from L3 cache $108_B$ to system memory $113_B$, as depicted by an operation 3A. Otherwise, the write-back may occur whenever cacheline 1330 is evicted from L3 cache 108B.

Subsequently, a consumer application 1334 hosted by a VM running Core A2 issues a Read request, which is forwarded to L3 cache agent 1316 (forwarding Read request not shown). In response, a copy of cacheline 1330 is written to Core A2's L1 data cache $116_{A2}$ via an operation 4, and subsequently consumed via an operation 5.

Figure 13B:
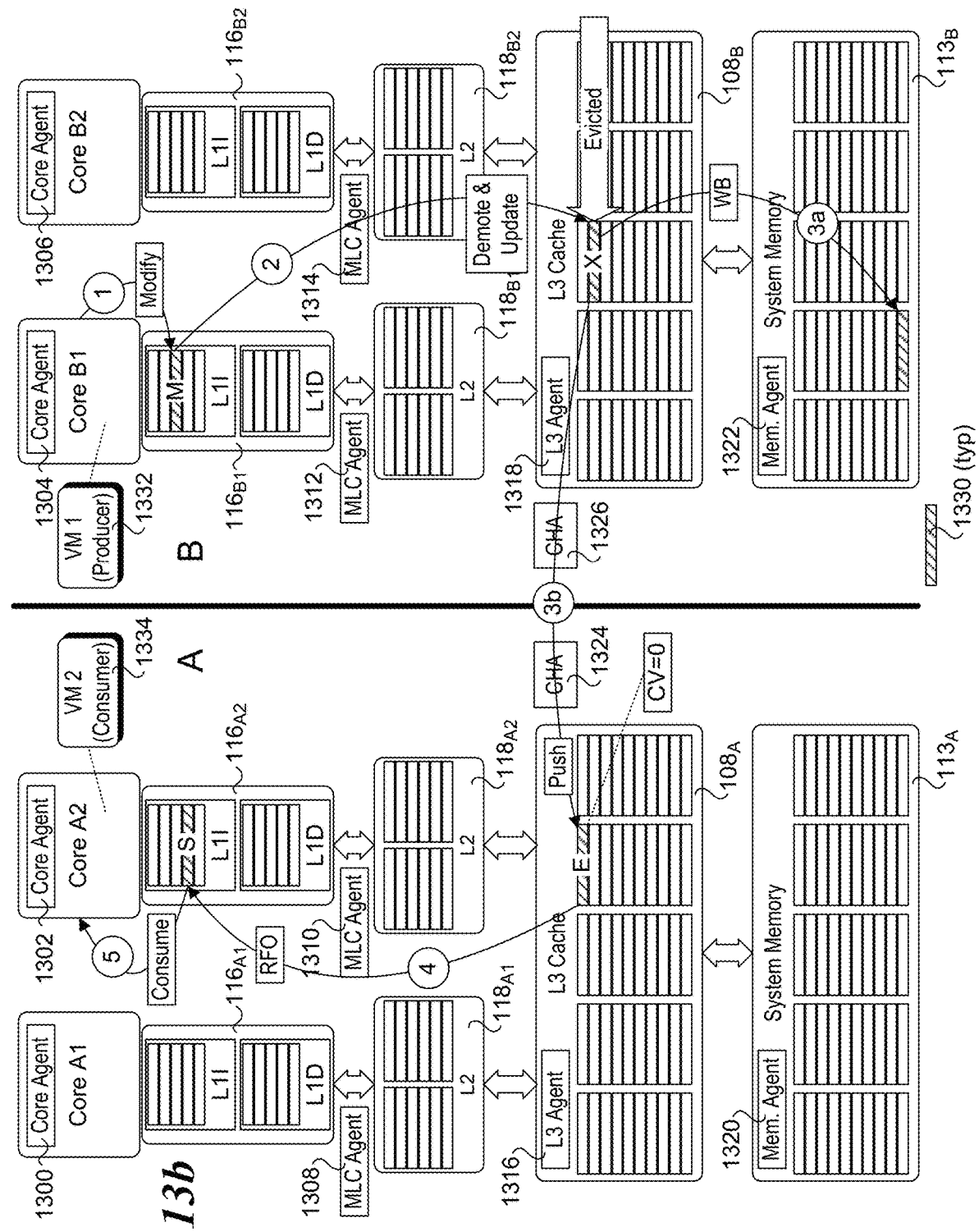
FIG. 13b is a schematic diagram illustrating a second example of demoting and pushing a cacheline to a remote socket, according to one embodiment.

FIG. 13b illustrates an optional scheme for proactively forwarding cacheline 1330. Under this embodiment, prior to the copy of the modified cacheline being pushed to L3 cache $108_A$ (operation 3b), it is proactively evicted and written back to memory, as shown by an operation 3a. The status of cacheline 1330 in L3 cache $108_A$ is marked as (E)xclusive, while at the same time CV is set to 0; although it is exclusive, it is yet to be owned by any core at this point. Subsequently, consumer application 1334 issues an RFO Write request, and the copy of cacheline 1330 is written from L3 cache $108_A$ to L1 data cache $116_{A2}$, enabling it to be consumed (operations 4 and 5, as before).

Figure 13C:
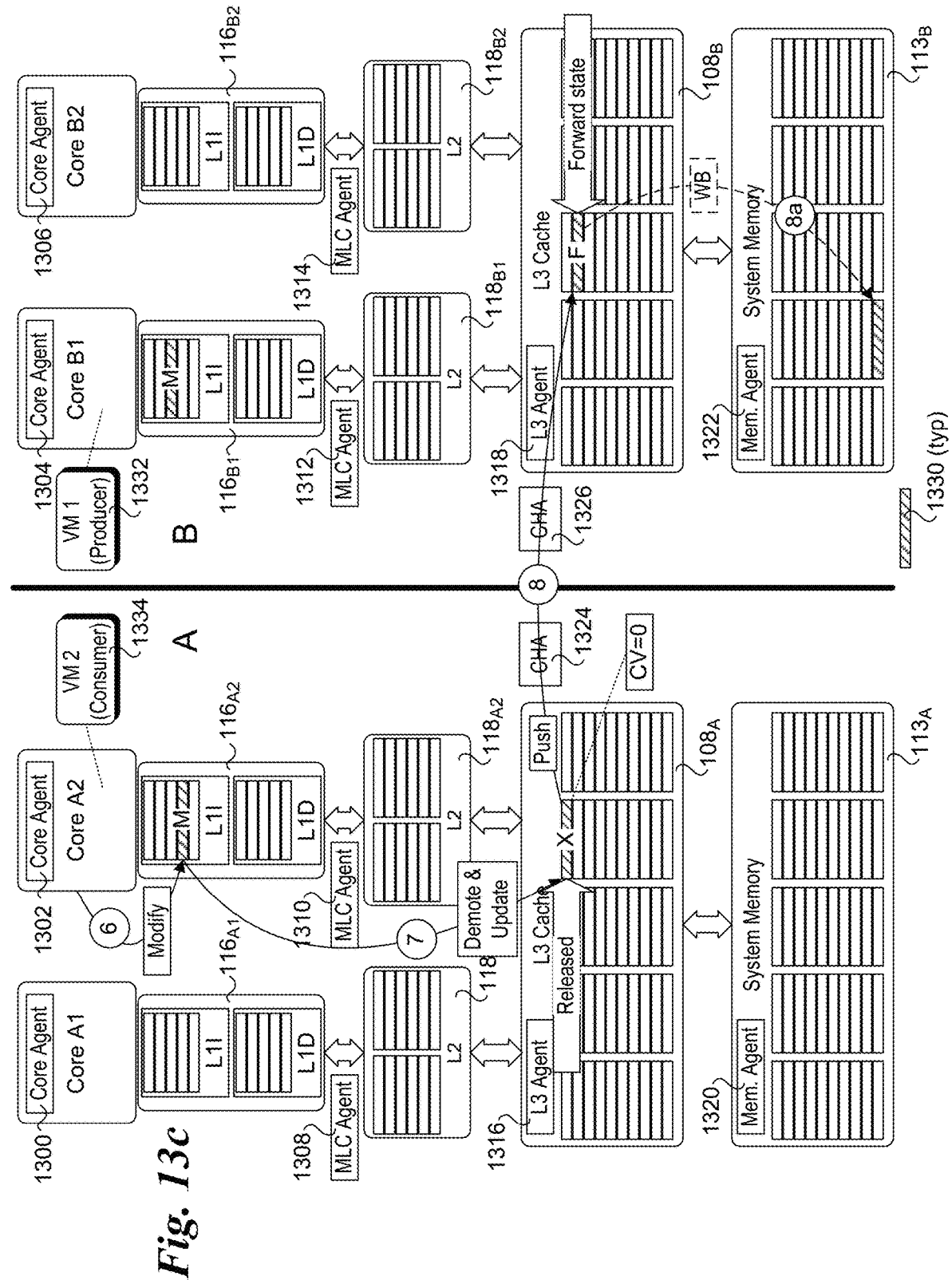
FIG. 13c is a schematic diagram illustrating an example of demoting a cacheline on a remote socket and pushing the cacheline to a local socket, according to one embodiment.

Proceeding to FIG. 13c, the consuming core may also modify the cacheline, as depicted by an operation 6, which changes the cacheline status to (M)odified. Again, the modified cacheline 1330 is proactively demoted to L3 cache $108_A$, which updates the copy of cacheline 1330 in this L3 cache. The modified copy of cacheline 1330 is then pushed from L3 cache $108_A$ into L3 cache $108_B$ via CHAs 1324 and 1326 via the socket-to-socket interconnect (not shown), and cacheline 1330 is marked in the (F)orward state, as depicted by an operation 8. As an option, the cacheline may be written back to system memory 113B, as depicted by an operation 8a. As another option, the copy of cacheline 1330 in L3 cache $108_A$ may be released. This is similar to being evicted, except it doesn't involve a write-back to the local system memory (since the cacheline is stored in the system memory on a remote socket (socket B in this example).

Figure 14:
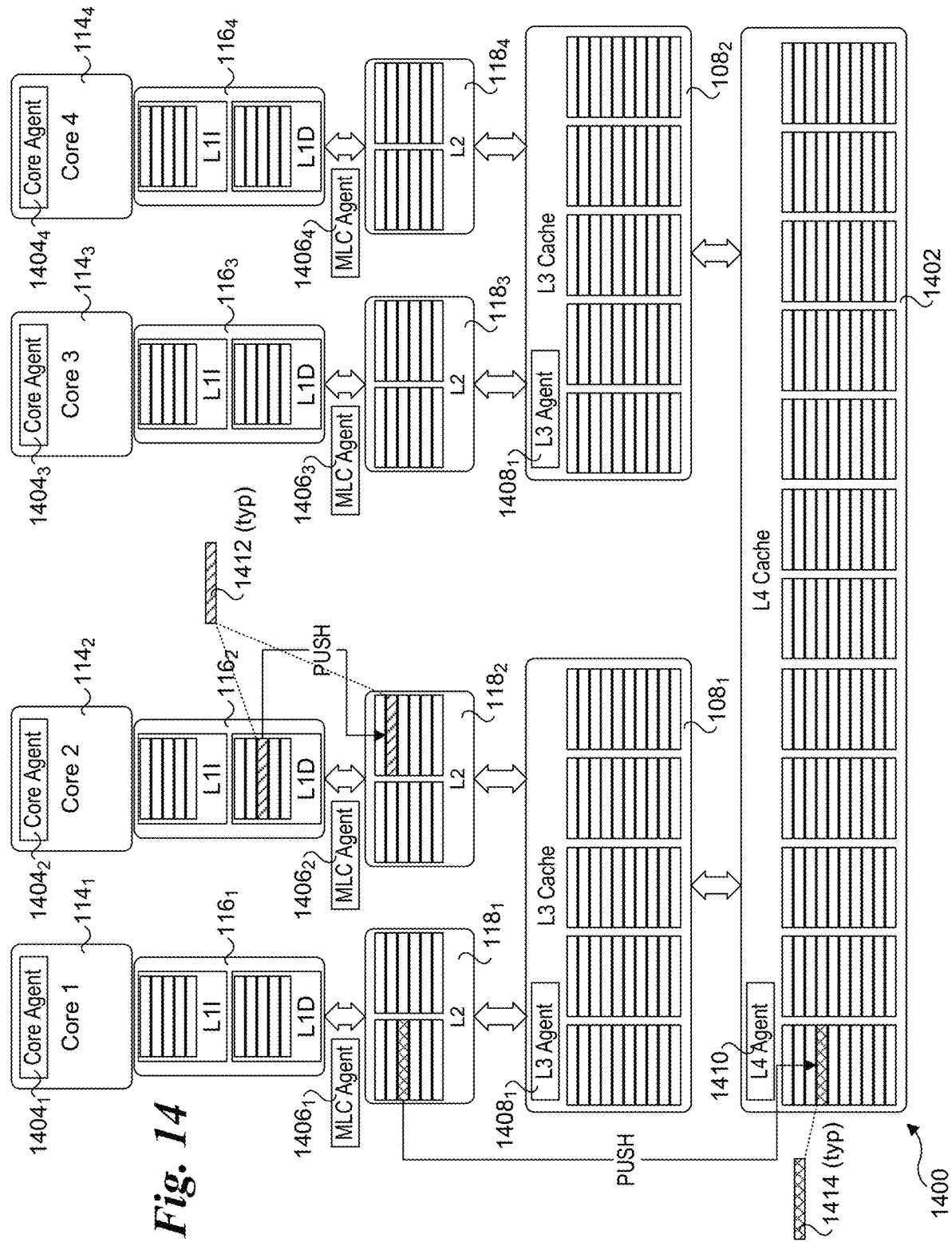
FIG. 14 is a schematic diagram of a cache hierarchy employing four cache levels.

FIG. 14 shows a cache architecture 1400 including an L4 cache 1402. The core, L1, L2, and L3 caches in cache architecture 1400 are similar to like-numbered components discussed above, and includes four cores 114 (also labeled Core 1, Core 2, Core 3, and Core 4, an L1 cache 116 for each core including a L1 instruction and L1 data cache, and an L2 cache 118 for each core. Generally, cache architecture 1400 may include n cores, with an L3 cache dedicated to a given subset of the n cores. For example, if there are three L3 caches, each L3 cache may be dedicated to n/3 cores. In the illustrated non-limiting example, an L3 cache 108 is dedicated to a pair of cores.

Each core 114 includes a core agent 1404 and has an associated MLC agent 1406, and an L3 cache agent 1408. L4 cache 1402 includes an L4 cache agent 1410. L4 cache 1402 operates as the LLC for cache architecture 1400, and is connected to system memory via a memory controller (both not shown).

FIG. 14 further illustrates two exemplary proactive push (and/or cacheline demote operations). Generally, a push or demote may be implemented between cache layers in the cache area, such that a given cacheline may be pushed down the cache hierarchy one level, two levels, or three levels. An example of a pushing down a cacheline a single level is depicted in a cacheline 1412 being pushed from Core 2's L1 data cache to its L2 cache $118_2$. Meanwhile, a cacheline 1414 is pushed out from Core 1's L2 cache $118_1$ to L4 cache 1402.

Reference to a CLLA instruction is described herein above, wherein "LL" (last-level) is included in the instruction name. However, this or a similar instruction may be used for demoting cachelines more generally, such as demoting a cacheline a specified number of levels in the cache hierarchy (e.g., 1, 2, 3, etc.). In addition, the same CLLA instruction may produce different results for different platforms, depending on the particular cache architectures of a given platform.

In addition to being advantageous for NFV and VM environments, the foregoing schemes may be applied to general producer-consumer workloads. The techniques may also be implemented for software running on both VMs or natively directly on the platform's processor cores.

Although some embodiments have been described in reference to particular implementations, other implementations are possible according to some embodiments. Additionally, the arrangement and/or order of elements or other features illustrated in the drawings and/or described herein need not be arranged in the particular way illustrated and described. Many other arrangements are possible according to some embodiments.

In each system shown in a figure, the elements in some cases may each have a same reference number or a different reference number to suggest that the elements represented could be different and/or similar. However, an element may be flexible enough to have different implementations and work with some or all of the systems shown or described herein. The various elements shown in the figures may be the same or different. Which one is referred to as a first element and which is called a second element is arbitrary.

In the description and claims, the terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still co-operate or interact with each other.

An embodiment is an implementation or example of the inventions. Reference in the specification to "an embodiment," "one embodiment," "some embodiments," or "other embodiments" means that a particular feature, structure, or characteristic described in connection with the embodiments is included in at least some embodiments, but not necessarily all embodiments, of the inventions. The various appearances "an embodiment," "one embodiment," or "some embodiments" are not necessarily all referring to the same embodiments.

Not all components, features, structures, characteristics, etc. described and illustrated herein need be included in a particular embodiment or embodiments. If the specification states a component, feature, structure, or characteristic "may", "might", "can" or "could" be included, for example, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

An algorithm is here, and generally, considered to be a self-consistent sequence of acts or operations leading to a desired result. These include physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like. It should be understood, however, that all of these and similar terms are to be associated with the appropriate physical quantities and are merely convenient labels applied to these quantities.

Italicized letters, such as 'i', 'j', 'l', 'm', 'n', 'p', etc. in the foregoing detailed description are used to depict an integer number, and the use of a particular letter is not limited to particular embodiments. Moreover, the same letter may be used in separate claims to represent separate integer numbers, or different letters may be used. In addition, use of a particular letter in the detailed description may or may not match the letter used in a claim that pertains to the same subject matter in the detailed description.

As discussed above, various aspects of the embodiments herein may be facilitated by corresponding software and/or firmware components and applications, such as software and/or firmware executed by an embedded processor or the like. Thus, embodiments of this invention may be used as or to support a software program, software modules, firmware, and/or distributed software executed upon some form of processor, processing core or embedded logic a virtual machine running on a processor or core or otherwise implemented or realized upon or within a computer-readable or machine-readable non-transitory storage medium. A computer-readable or machine-readable non-transitory storage medium includes any mechanism for storing or transmitting information in a form readable by a machine (e.g., a computer). For example, a computer-readable or machine-readable non-transitory storage medium includes any mechanism that provides (i.e., stores and/or transmits) information in a form accessible by a computer or computing machine (e.g., computing device, electronic system, etc.), such as recordable/non-recordable media (e.g., read only memory (ROM), random access memory (RAM), magnetic disk storage media, optical storage media, flash memory devices, etc.). The content may be directly executable ("object" or "executable" form), source code, or difference code ("delta" or "patch" code). A computer-readable or machine-readable non-transitory storage medium may also include a storage or database from which content can be downloaded. The computer-readable or machine-readable non-transitory storage medium may also include a device or product having content stored thereon at a time of sale or delivery. Thus, delivering a device with stored content, or offering content for download over a communication medium may be understood as providing an article of manufacture comprising a computer-readable or machine-readable non-transitory storage medium with such content described herein.

Various components referred to above as processes, servers, or tools described herein may be a means for performing the functions described. The operations and functions performed by various components described herein may be implemented by software running on a processing element, via embedded hardware or the like, or any combination of hardware and software. Such components may be implemented as software modules, hardware modules, special-purpose hardware (e.g., application specific hardware, ASICs, DSPs, etc.), embedded controllers, hardwired circuitry, hardware logic, etc. Software content (e.g., data, instructions, configuration information, etc.) may be provided via an article of manufacture including computer-readable or machine-readable non-transitory storage medium, which provides content that represents instructions that can be executed. The content may result in a computer performing various functions/operations described herein. Optionally, functionality provided by components such as the agents and CHAs described herein may be implemented using embedded logic using well-known techniques, such as through use of standard or custom libraries.

As used herein, a list of items joined by the term "at least one of" can mean any combination of the listed terms. For example, the phrase "at least one of A, B or C" can mean A; B; C; A and B; A and C; B and C; or A, B and C.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize.

These modifications can be made to the invention in light of the above detailed description. The terms used in the following claims should not be construed to limit the invention to the specific embodiments disclosed in the specification and the drawings. Rather, the scope of the invention is to be determined entirely by the following claims, which are to be construed in accordance with established doctrines of claim interpretation.

What is claimed is:

1. A processor, configured to be implemented in a computer system including system memory, comprising:
    a plurality of cores, at least two cores having an associated set of local caches including a first-level (L1) instruction cache, an L1 data cache and a second-level (L2) cache;
    a last level cache (LLC); and
    a memory controller, communicatively coupled to the plurality of cores, configured to support access to the system memory when the processor is installed in the computer system,
    wherein each of the L1 data caches, L2 caches, and the LLC include a plurality of cachelines for storing cacheline data, wherein the L1 instruction caches including a plurality of cachelines for storing machine instructions, wherein each of the at least two cores having an associated set of local caches is configured to retrieve machine instructions cached in the core's L1 instruction cache and execute the machine instructions, and wherein the core supports execution of a cacheline demote instruction comprising a single machine instruction that is part of a compiled instruction thread that when read from the core's L1 instruction cache and executed by the core results in a cacheline being demoted from a local cache having a lower level to a cache having a higher level.

2. The processor of claim 1, wherein execution of the cacheline demote instruction causes the cacheline to be demoted from the L1 data cache to the LLC.

3. The processor of claim 2, wherein execution of the cacheline demote instruction causes a write-back of the cacheline to system memory.

4. The processor of claim 1, wherein the cacheline is held in a first cache at an associated level in a cache hierarchy, and wherein execution of the machine instruction causes the cacheline to be demoted to a cache that is two levels above the first cache.

5. The processor of claim 1, wherein the processor includes a third level (L3) cache and a fourth level (L4) cache comprising the LLC.

6. The processor of claim 1, wherein execution of the cacheline demote instruction causes the cacheline that is demoted to be evicted from the local cache having the lower level.

7. The processor of claim 1, wherein the L1 instruction cache and L1 data cache has an associated L1 cache agent and the LLC has an associated LLC agent, and wherein execution of the cacheline demote instruction causes a cacheline demote message to be sent from the L1 cache agent to the LLC agent to demote the cacheline to the LLC.

8. The processor of claim 1, wherein the processor is configured such that when installed in the computer system the processor reads instructions comprising an instruction thread comprising the compiled thread of machine instructions including an instance of the cacheline demote instruction stored in the system memory, caches the instructions that are read in the L1 instruction cache, and executes the instruction thread.

9. The processor of claim 8, wherein execution of the instruction thread causes data in a cacheline in the L1 data cache that is to be demoted to be modified, and wherein demoting the cacheline to the LLC comprises overwriting data in a cacheline in the LLC with the modified data in the demoted cacheline and marking the cacheline as Modified.

10. A method implemented on a multi-core processor including a last level cache (LLC), comprising:
    retrieving, via a first core of the multi-core processor, a compiled thread of machine instructions generated by compiling source code for an application from a first-level (L1) instruction cache associated with the first core and executing the compiled thread of machine instructions on the first core, wherein the compiled thread of machine instructions includes a cacheline demotion instruction, and wherein execution of the cacheline demotion instruction causes a cacheline in an L1 data cache associated with the first core to be demoted to the LLC.

11. The method of claim 10, wherein execution of the cacheline demote instruction causes the cacheline to be evicted from the L1 data cache.

12. The method of claim 11, wherein the processor is installed in a system including system memory, and wherein execution of the cacheline demote instruction causes a write-back of the cacheline to the system memory.

13. The method of claim 10, wherein the L1 instruction cache and L1 data cache has an associated L1 cache agent and wherein the LLC has an associated LLC agent, further comprising sending a cache line demote message from the L1 cache agent to the LLC agent to demote the cacheline to the LLC.

14. The method of claim 10, wherein the processor is installed in a system including system memory, further comprising:
    reading instructions comprising the compiled thread of machine instructions from system memory; and
    caching the machine instructions that are read from system memory in the L1 instruction cache.

15. The method of claim 14, wherein execution of the compiled thread of machine instructions causes data in a cacheline in the L1 data cache that is to be demoted to be modified, and wherein demoting the cacheline to the LLC comprises overwriting data in a cacheline in the LLC with the modified data in the demoted cacheline and marking the cacheline as Modified.

16. The method of claim 10, further comprising:
    issuing, from the core executing the compiled thread of machine instructions, a request for ownership of a cacheline storing data to be modified;

accessing the cacheline from the LLC and caching the cacheline in the L1 data cache;
modifying data in the cacheline; and
demoting the cacheline to the LLC.

17. The method of claim 16, further comprising:
in connection with accessing the cacheline from the LLC, changing cacheline status data for the cacheline in the LLC to identify the core issuing the request for ownership has a valid copy of the cacheline.

18. A tangible non-transitory machine-readable medium having instructions stored thereon comprising one of more compiled instruction threads generated by compiling one or more applications and configured to be executed on a multi-core processor including a coherent set of caches having a multi-level hierarchy including a last level cache (LLC) having an instruction set architecture supporting a cacheline demote machine instruction, wherein execution of the instructions on a computing system having system memory and including the processor enable the computing system to:
perform first processing operations on first data via execution of the one of more compiled instruction threads on a first core of the multi-core processor having an associated first level (L1 data cache), the first processing operations accessing at least a portion of the first data from a shared portion of memory in the system memory, modifying a data object associated with the first data, and caching data associated with the modified data object in the L1 data cache; and
execute one or more instances of the cacheline demote machine instruction included in a compiled instruction thread among the one or more compiled instruction threads to cause the data associated with the modified data object to be written to the LLC by demoting one or more cachelines in an L1 data cache to the LLC.

19. The tangible non-transitory machine-readable medium of claim 18, wherein execution of the instructions further enable the computing system to perform second processing operations on the modified data object via execution of one of more compiled instruction threads associated with the one or more applications on a second core of the multi-core processor, the second processing operations accessing data associated with the modified data object from the LLC.

20. The tangible non-transitory machine-readable medium of claim 19, wherein the one or more compiled instruction threads executed on the first processor core comprise instructions for a producer application, and the one or more compiled instruction threads executed on the second processor core comprise instructions for a consumer application.

* * * * *